United States Patent [19]

Hozumi

[11] Patent Number: 5,621,819

[45] Date of Patent: Apr. 15, 1997

[54] MULTIDIMENSIONAL MULTI-VALUED COLOR IMAGE COMPRESSION AND DECOMPRESSION METHOD

[75] Inventor: Yoshiko Hozumi, Zushi, Japan

[73] Assignee: Victor Company of Japan, Ltd., Yokohama, Japan

[21] Appl. No.: 427,095

[22] Filed: Apr. 21, 1995

[30] Foreign Application Priority Data

Apr. 22, 1994 [JP] Japan ................................. 6-107819
Jul. 8, 1994 [JP] Japan ................................. 6-180830

[51] Int. Cl.⁶ ............................................. G06K 9/00
[52] U.S. Cl. ............................................. 382/232; 382/166
[58] Field of Search ................................. 382/166, 242, 382/300, 162, 163, 164, 165, 167, 180, 173, 174, 233, 232, 235, 243, 254, 266, 270, 274, 282, 283, 293, 307, 308; 358/501, 400, 401, 426, 427, 261.1, 261.2, 261.3, 261.4, 262.1, 428, 429, 430, 431, 432, 433

[56] References Cited

U.S. PATENT DOCUMENTS

| | | | |
|---|---|---|---|
| 4,673,977 | 6/1987 | Stelzenmuller | 382/166 |
| 4,965,845 | 10/1990 | Chan et al. | 382/166 |
| 5,014,334 | 5/1991 | Fukuhara et al. | 382/166 |
| 5,053,861 | 10/1991 | Tsai et al. | 358/13 |
| 5,065,229 | 11/1991 | Tsai et al. | 358/21 R |
| 5,227,863 | 7/1993 | Bilbrey et al. | 358/22 |
| 5,261,049 | 11/1993 | Lumelsky et al. | 395/164 |

FOREIGN PATENT DOCUMENTS

| | | | |
|---|---|---|---|
| 5-35872 | 2/1993 | Japan | G06F 15/70 |
| 5-39492 | 8/1994 | Japan | G06F 15/66 |

*Primary Examiner*—Leo Boudreau
*Assistant Examiner*—Bijan Tadayon
*Attorney, Agent, or Firm*—Jacobson, Price, Holman & Stern, PLLC

[57] ABSTRACT

A multidimensional multi-valued image compression and decompression method obtains feature points satisfying a specific condition on an equi-luminance line set for each specific luminance value previously determined for an image luminance function, and transmits and records positions and luminance values at the feature points to restore an image. In compression, pixel contours are traced on the equi-luminance line set. Specific equi-luminance line passing point coordinates on the pixel contours are shifted to a central position of each pixel. In decompression, a region where the equi-luminance line on the image is a boundary is divided into a bright and a dark region according to a luminance threshold. The divided regions are filled with bright and dark symbols, respectively, to form a mask representative of the image based on the bright and dark symbols.

12 Claims, 28 Drawing Sheets

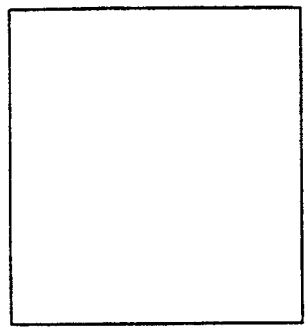
MASK No.1
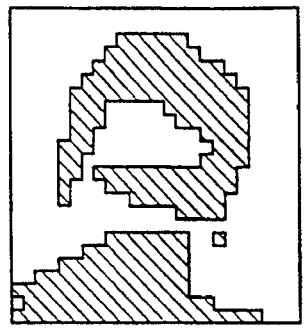
MASK No.4
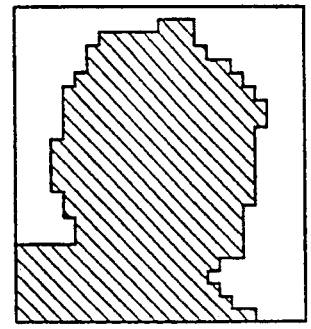
MASK No.7
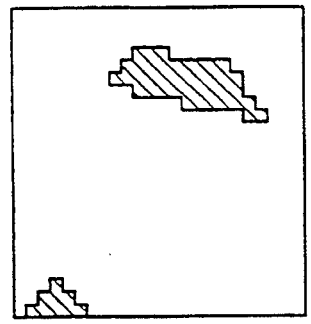
MASK No.2
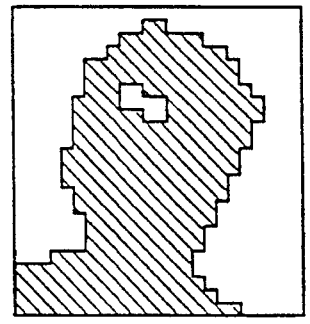
MASK No.5
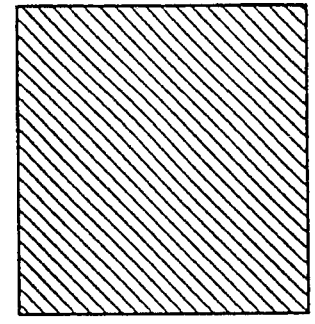
MASK No.8
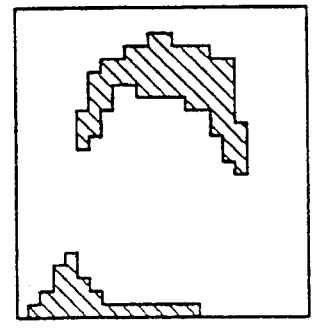
MASK No.3
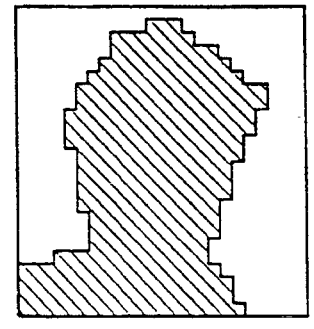
MASK No.6
FIG.13

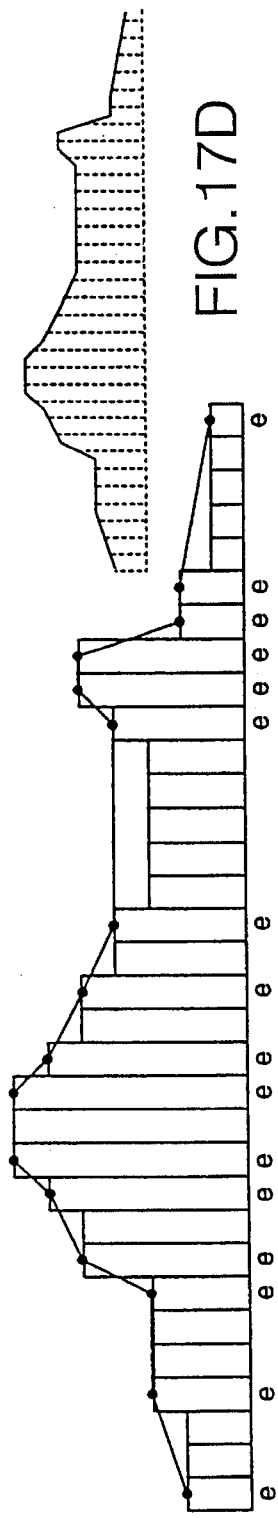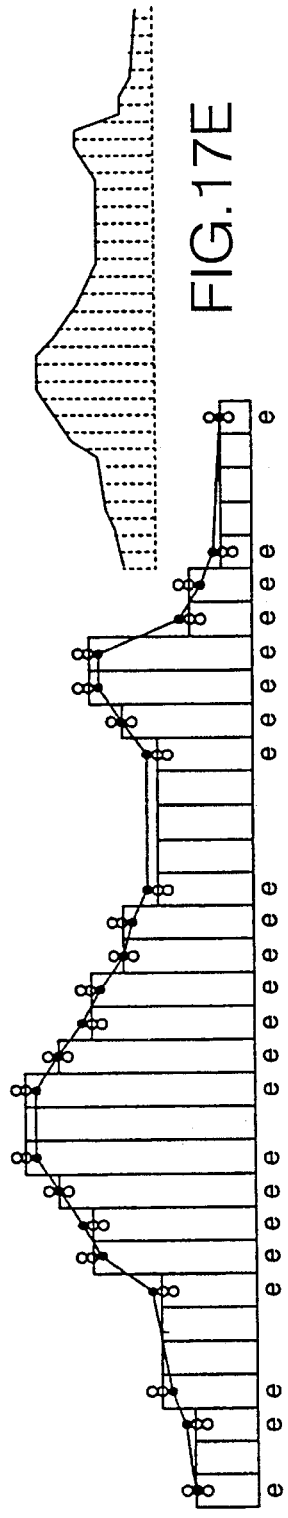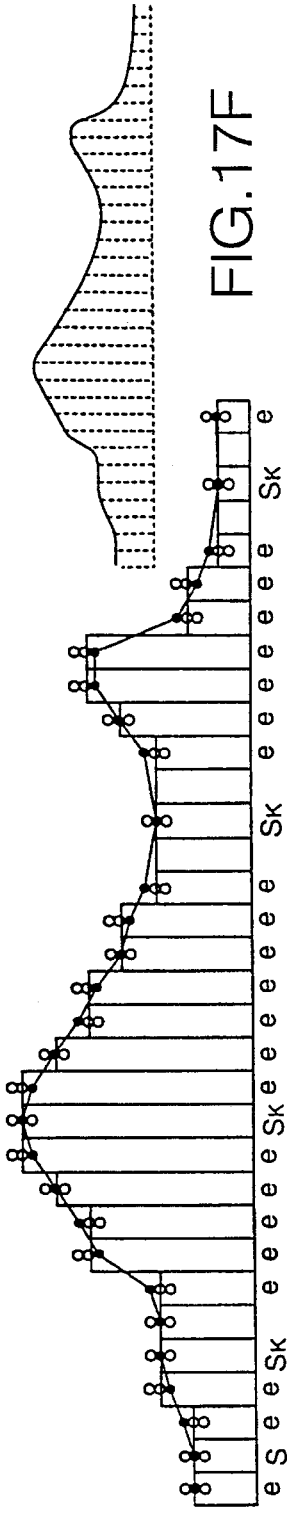

⟨1⟩ 「UNDECIDED」

⟨2⟩ 「LOW」

⟨3⟩ 「HIGH」

⟨4⟩ 「INTER」

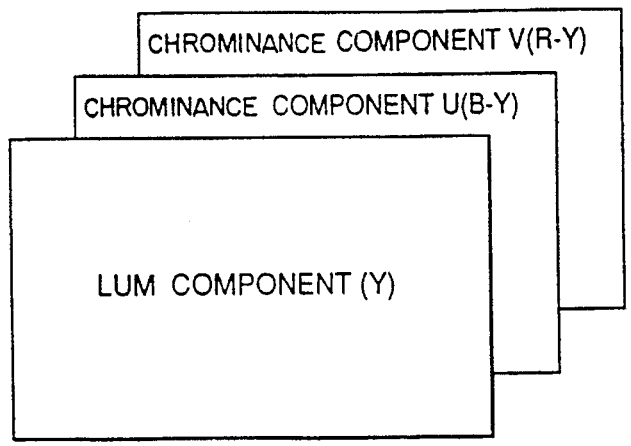
FIG.31
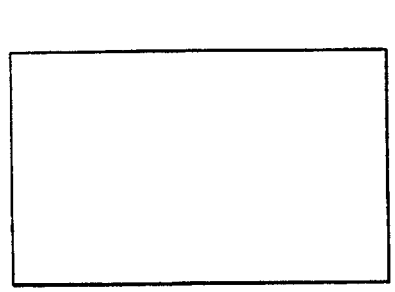
FIG.32A
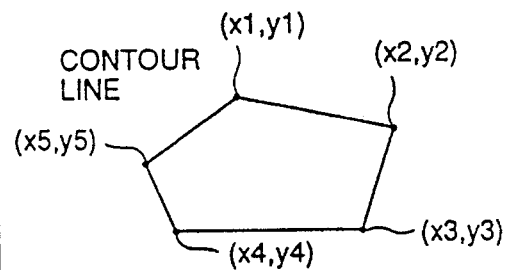
FIG.32B
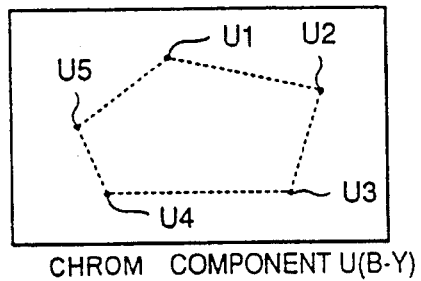
FIG.33A
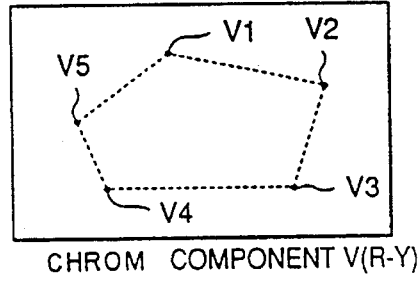
FIG.33B
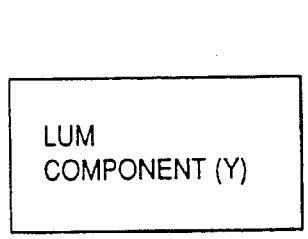
FIG.34A
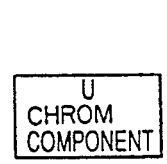
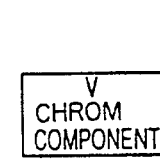
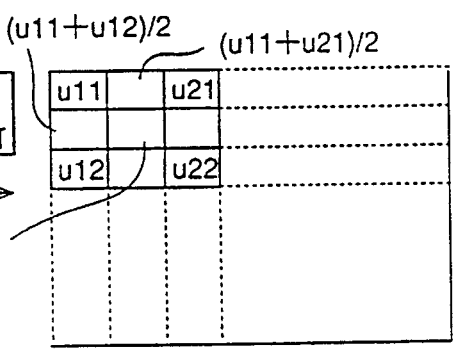
FIG.34B

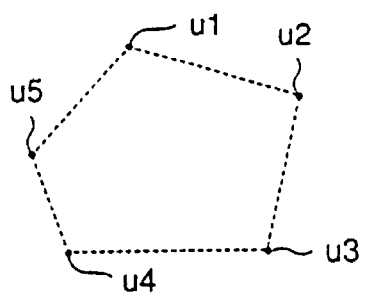
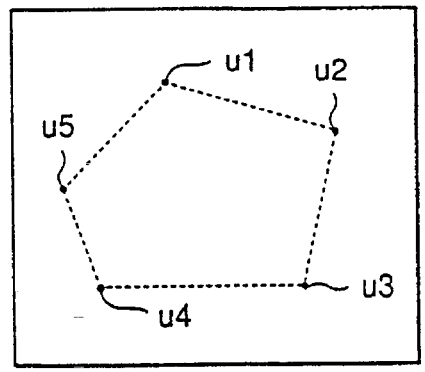
LINE DRAWING
FIG.35A  FIG.35B
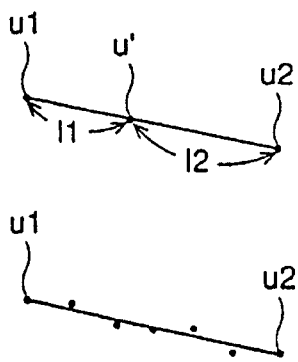
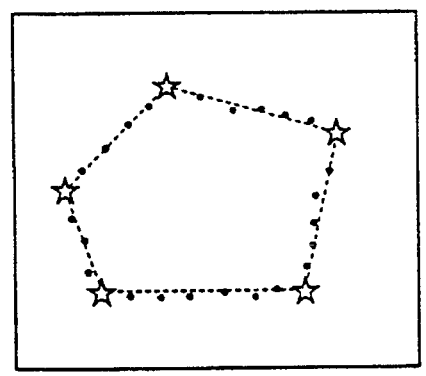
$u' = u1 + (u2-u1)l1/(l1+l2)$
FIG.36A  FIG.36B
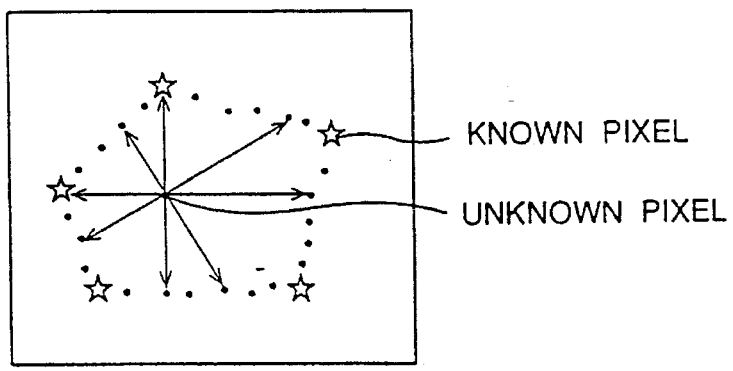
☆ KNOWN PIXEL
• UNKNOWN PIXEL
FIG.37

| FEATURE PT | X-COORDINATE | Y-COORDINATE | CHROM. COMPONENT U | DIFF FROM U | U |
|---|---|---|---|---|---|
| 1 | 56 | 122 | 108 | — | 108 |
| 2 | 63 | 124 | 107 | 1 | — |
| 3 | 65 | 150 | 111 | 3 | — |
| 4 | 62 | 153 | 111 | 3 | — |
| 5 | 62 | 150 | 113 | 5 | — |
| 6 | 57 | 151 | 119 | 11 | 119 |
| 7 | 60 | 143 | 111 | 8 | 111 |
| 8 | 58 | 140 | 115 | 4 | — |
| 9 | 54 | 143 | 115 | 4 | — |
| 10 | 56 | 148 | 119 | 8 | 119 |
| 11 | 54 | 143 | 115 | 4 | — |
| 12 | 58 | 126 | 112 | 7 | 112 |

FIG.38A

| FEATURE PT | X-COORDINATE | Y-COORDINATE | CHROM. COMPONENT V | DIFF FROM V | V |
|---|---|---|---|---|---|
| 1 | 56 | 122 | 146 | — | 146 |
| 2 | 63 | 124 | 151 | 5 | — |
| 3 | 65 | 150 | 148 | 2 | — |
| 4 | 62 | 153 | 147 | 1 | — |
| 5 | 62 | 150 | 144 | 2 | — |
| 6 | 57 | 151 | 137 | 9 | 137 |
| 7 | 60 | 143 | 145 | 8 | 145 |
| 8 | 58 | 140 | 142 | 3 | — |
| 9 | 54 | 143 | 144 | 1 | — |
| 10 | 56 | 148 | 139 | 6 | 139 |
| 11 | 54 | 143 | 144 | 5 | — |
| 12 | 58 | 126 | 142 | 3 | — |

FIG.38B

MULTIDIMENSIONAL MULTI-VALUED COLOR IMAGE COMPRESSION AND DECOMPRESSION METHOD

BACKGROUND OF THE INVENTION

1. Field of the Invention

The present invention relates to a multidimensional multi-valued color image compression and decompression method, and more specifically to the multidimensional multi-valued color image compression and decompression method of compressing and decompressing image information effectively in such a system that the correspondence between the compression side and the decompression side is not guaranteed with respect to pixels or frames on time axis, as with the case of the image transmission between two image system of different models.

2. Description the Related Art.

When image signals are converted into digital image signals on the basis of linear quantization (uniform quantization), in general when a difference between a representative point and an original point is required to be not noticed in a natural image, it is necessary to use the number of bits from 6 bits (64 gradations) to 8 bits (256 gradations) for each sample value of the image signals. Therefore, when the image signals digitalized on the basis of uniform quantization are recorded as they are, a great amount of image information must be processed.

To code the image signals on the basis of a lesser amount of image information, various methods of compressing the image information, that is, the various methods of efficient coding have been so far proposed.

For instance, there exists such a method of utilizing the human nature as to the sense of sight or hearing such that the human sensitivity is high when a change is gentle but low when a change is violent, whenever audio or video signals change.

Or else, there exists such a method of utilizing correlation between image information values on the time-or space-axis. In this method, using high correlation in luminance value between adjacent pixels, a small number of approximation values of the original information are transmitted; or differences in image signal between pixels or between frames are transmitted; or the frequency components are reduced on the basis of the fact that the high frequency components are less.

As described above, after the amount of information for each sample value has been reduced, the digital data are recorded, transferred or transmitted. Further, after having received and reproduced the digital data (whose amount of information has been already compressed) are decompressed for restoration of the compressed digital data to the original The above-mentioned various methods have been so far executed and thereby well known.

In the above-mentioned prior art image information compression methods, however, a main stress has been so far laid on how to restore the decomposed image signals at the respective pixels under excellent conditions. In this case, however, the compression method is usually established under the conditions that the number of pixels of the original image (on the compression side) matches that of the restored image (on the decompressed images). As a result, when the compression and decompression operation is effected between images of different numbers of pixels, it has been so far necessary to additionally interpolate or reduce the number of the pixels after decompression.

In the prior art image information compression method, this implies that only true effective information is not necessarily extracted end then restored, but that the image information is dependent, to same extent, upon the physical image constituting elements, such as the number of pixels, pixel shapes and luminance level.

On the other hand, as an example in which the number of pixels is extremely different from each other between original image and the decompressed image, there exists the case where an image photographed by an image sensing device is required to be used as a print block copy. In this case, the pixel density of an image obtained by sensing device is about (500×500) per frame at the most. On the other hand, the pixel density of an image printed by an electronic photoengraving machine is about (several thousands×several thousands) per frame, which is extraordinarily larger than that of the image sensing device. As a result, even if the compression and decompression method is not at all adopted to the image information, aliasing occurs due to the enlargement of the pixels.

Further, when interpolation is only effected without enlarging the pixels, the weighted mean values of known data must be allocated to a wide interpolation area, so that the image inevitably deteriorates due to interpolation distortion.

In contrast with this, in the case where the pixel density of the original image is as large as (several thousands× several thousands), since the correlation between adjacent pixels is extremely high, it is possible to compress the image information at a high compression ratio in principle.

In this case, however, in the prior art image information compression and decompression method established under the conditions that the number of pixels of the original image (on the compression side) matches that of the restored image (on decompression side), there arises such a drawback that it is impossible to increase the compression ratio.

To overcome this problem, the applicant of the present invention has already proposed a multidimensional multi-valued compression and decompression method suitable for when the number of pixels of the original image does not match that of the reproduced image, in Japanese Patent Application No. 5-39492 (in 1993).

This method can be summarized as follows: first equi-luminance contour lines are obtained on the basis of image information only feature points (feature pixels) of the image are extracted on the basis of the equi-luminance contour lines to obtain compressed image data; and the feature point positions and the luminance values at these feature points are both transferred and recorded. In the decompression of the image information, the luminance values at pixels other than the feature points are decided on the basis of an interpolation plane decided by the feature points and a plurality of adjacent feature points. Here, the feature points are the negative or positive maximum points of each of the curvatures of the equi-luminance contour lines, for instance. Or else, the feature points are decided at positions where a difference between a straight line (obtained by approximating the equi-luminance contour line) and the equi-luminance contour line exceeds a predetermined threshold, respectively.

On the other hand, in order to obtain the equi-luminance contour lines, it is necessary to trace the pixels having a specific luminance value. In the above-mentioned related image tracing method, the centers of the boundary pixels are traced, and a chain code train has been adopted. In this case, there exist problems in that an error is produced at a contour between the original image and the reproduced image or in that a long processing time is required because the amount of information to be process is huge.

Further, when the luminance values are binarized on the basis of a luminance threshold to extract the equi-luminance line, if the distribution of extracted equi-luminance line forms a narrow triangular shape for instance, there exists such a case that a white region with a single pixel width appears. Under these conditions, when the centers of the boundary pixels are traced, there exists a case where a center of one pixel appears twice. As a result, when a character is enlarged, there exists problem in that the white region remains as a straight line with a single pixel width.

To overcome this problem, the applicant of the present invention has disclosed a binary image contour tracing method, in Japanese Laid-Open Patent Application No. 5-35872 (in 1993).

In this binary image contour tracing method, the tracing direction of a boundary point of a pixel is defined on the basis of white and black at four pixels around the boundary point. In more detail, the tracing direction is determined in such a direction that black pixels are present on the right side and white pixels are present on the left side. In this case, when the tracing direction is upward in an image stood vertically, the direction decided as [1]; when leftward, the direction is decided as [2]; and when downward, the direction is decided as [3]; and when rightward, the direction is decided as [0], respectively.

The above-mentioned directions are allocated to the respective bits of 4-bit tracing direction flags. In addition, the above tracing direction flags are attached to all the boundary points of the image, by setting bit [1] to the boundary points to be traced and [0] to the boundary points to be not traced.

Further, the tracing direction flag at a boundary point already traced is changed, by retrieving a boundary point on the basis of the tracing direction flag and by tracing another boundary point in the tracing direction beginning from the retrieved boundary point as a start point. The above-mentioned tracing is effected until the all the tracing direction flags change to [0000], that is, until the image contour can be obtained.

In the above-mentioned binary image contour tracing method, it is possible to trace the boundary pixels (boundary points) by only allocating the previously defined tracing directions to an inputted image. In other words, since it is unnecessary to retrieve the tracing direction for each pixel, it is possible to eliminate a large capacity memory unit and further to shorten the processing time thereof.

In this related method, however, since the image contour is traced along the boundary lines of pixels by deciding the tracing direction in such a way that the black pixel is present on the right side and the white pixel is present on the left side along the tracing direction, when the reproduced image is observed, there exists a problem in that a black pixel is produced for each pixel on the left side along the tracing direction. This causes no problem when the original image is a character, for instance. However, when the original image is an ordinary image, this causes a deterioration of image quality.

As a result, when the above-mentioned binary image contour tracing method is applied to the already proposed multidimensional image compression and decompression method, a method of solving the above-mentioned problems is needed.

In addition, in the already proposed multidimensional image compression and decompression method, the equi-luminance contour lines (an equi-luminance plane in the case of three dimensions) are approximated by a polygonal shape on the basis of the extracted feature points. Further, the luminance information at pixels other than the feature points are decided on the basis of an interpolation plane (an interpolation solid in the case of three dimensions) decided by a plurality of adjacent feature points.

The above-mentioned equi-luminance contour line is different from the original equi-luminance contour line because the information values are compressed. Therefore, there exists a problem in that the order of the luminance intensities is reversed between the two equi-luminance contour lines at some points, with the result that the luminance distribution of the reproduced image is not normal and thereby the image quality deteriorates. A method of solving this problem has been also required.

Further, when the reproduced image is of color image, the color image is usually divided into three primary color image components, or into a luminance component and two chrominance components, before the color image is recorded, reproduced, transmitted and processed. Similarly, in the case of the compression end decompression of the color images, it is conventional to code and decode the above-mentioned respective signal components separately. However, when the luminance component and the chrominance components are coded and decoded separately in the color image compression and decompression, since two different codes are allocated to the luminance component and the chrominance components, respectively, it is impossible to reduce the amount of codes below a constant value.

Therefore, it is impossible to solve the above-mentioned problem by simply applying the image compression and decompression technique, as proposed by the Japanese Patent Application No. 5-39492, to the conventional color image compression and decompression processing. On the other hand, when the respective feature points are decided by extracting the respective equi-luminance lines for each of a plurality of image components for constituting the color image, there arises the other problem in that a number of feature points increases and further color shearing is produced between the image components due to the polygonal approximation executed for the information compression.

SUMMARY OF THE INVENTION

With these problems in mind, therefore, it is the object of the present invention to provide a multidimensional multi-valued image compression and decompression method, which can solve the various problems so far not solved by the related art.

To achieve the above-mentioned object, the present invention provides a multidimensional multi-valued image compression and decompression method of obtaining feature points satisfying a specific condition on an equi-luminance line set for each specific luminance value previously determined for an image luminance function, and transmitting and recording positions and luminance values at the obtained feature points to restore an image, which comprises, in compression, the steps of: tracing at least one pixel contour on the equi-luminance line; and shifting specific equi-luminance line passing-point coordinates on the traced pixel contour to a central position of the pixel, respectively.

Further, in the above-mentioned method, when an initial tracing direction of the pixel contour matches a vertical scanning direction of the image, the specific equi-luminance line passing-point coordinates are shifted to the central position of the pixel locating on the left side of the tracing direction, respectively; and when the initial tracing direction of the pixel contour matches a horizontal scanning direction of the image, the specific equi-luminance line passing-point coordinates are shifted to the central position of the pixel locating on the right side of the tracing direction, respectively.

Further, the present invention provides a multidimensional multi-valued image compression and decompression method of obtaining feature points satisfying a specific condition on an equi-luminance line set for each specific luminance value previously determined for an image luminance function, and transmitting and recording positions and luminance values at the obtained feature points restore an image, which comprises, in decompression, the steps of: to obtain at least one equi-luminance line of a specific luminance value, dividing a region in which the equi-luminance line on the image is a boundary, into a bright region and a dark region according to a luminance threshold on the image; and filling the divided regions with bright and dark symbols, respectively to form a mask representative of the image on the basis of the binary bright and dark symbols.

Further, the above-mentioned method further comprises the steps of: arranging a plurality of masks representative of the image in the order of intensities of the luminance threshold values corresponding to the respective masks; representing the region between two adjacent masks by an intermediate luminance value between the luminance threshold values of the two adjacent masks; when the relationship between a first luminance value of at least one predetermined central pixel in the mask and second luminance values of eight pixels around the predetermined central pixel is that: (1) the second luminance values are equal to the first luminance value, the first luminance value is determined to be undecided; (2) the second luminance values are not higher than the first luminance value, the first luminance value is determined to be the intermediate value −a, where a is a positive value; (3) the second luminance values are not lower than the first luminance value, the first luminance value is determined to be the intermediate value +a; and (4) the relationship between the first and second luminance values are other than the above (1) to (3), the first luminance value As determined to be the intermediate value; extracting a central line from the region including the pixel of the undecided luminance value, to set at least one pixel on the central line of the region to the intermediate luminance value.

Further, the above-mentioned method further comprises the step of: deciding a luminance value at a luminance-undecided pixel locating away from the central line of the region, in accordance with linear interpolation on the basis of two luminance values at two luminance-decided pixels locating on both ends of at least one line extending from the luminance-undecided pixel in a predetermined direction and on the basks of distances between the luminance-undecided pixel and the luminance-decided pixels.

Further, the above-mentioned method further comprises the step of: deciding a luminance value at a luminance-undecided pixel locating away from the central line of region, by averaging the luminance values obtained in accordance with a plurality of linear interpolations on the basis of respective two luminance values at two respective luminance-decided pixels locating on both ends of each of a plurality of lines extending from the luminance-undecided pixel in a plurality of predetermined directions and on the basis of respective distances between the luminance-undecided pixel and the luminance-decided pixels along each of a plurality of the extension lines.

Further, the above-mentioned method further comprises the step of: deciding a luminance value at a luminance-undecided pixel locating away from the central line of the region on the basis of plane interpolation values obtained by use of three luminance-decided pixels in the vicinity of the luminance-undecided pixel.

Further, in the above-mentioned method, when a difference in the luminance threshold between the two adjacent masks is determined d, a=d/3.

Further, the present invention provides a color image compression and decompression method, which comprises the steps of: obtaining two-dimensional image addresses and luminance values at a plurality of feature points satisfying a specific condition on an equi-luminance line set for each specific luminance value previously determined for luminance component for constituting a color image together with chrominance components; obtaining the chrominance component values on the basis of the chrominance components on the feature points; adding the obtained chrominance component values to the two-dimensional address of the luminance component at each feature point, as four-dimensional address data; setting feature point positions of the chrominance components to feature point positions of the luminance component; and transmitting and recording the chrominance component values at the positions, to restore an image.

Further, the above-mentioned method further comprises the steps of: setting an allowable value for the respective chrominance component values at each feature points on equi-luminance line; when the chrominance component values at each feature point do not exceed the set allowable value, the chrominance component values at a current feature point are determined to be the same as chrominance component values at a preceding feature point, to reduce the occurrence frequency of the chrominance component values.

Further, in the above-mentioned method, the chrominance component values are obtained in accordance with difference calculus or logarithmic difference calculus or vector quantization method.

BRIEF DESCRIPTION OF THE DRAWINGS

FIG. 13 shows a plurality of plane views for assistance in explaining the luminance value masks of different thresholds, respectively;

FIG. 16 is a distribution diagram showing luminance values at the respective pixels in the image;

FIGS. 17A, 17B and 17C are one-dimensional luminance distribution diagrams for assistance in explaining the luminance value interpolation in the decompression of an image;

FIGS. 17D, 17E, and 17F respectively illustrate luminance distribution curves obtained from the interpolations illustrated in FIGS. 17A, 17B and 17C;

FIG. 21 is an example of distribution diagram of luminance values at the respective pixels under the specific conditions in an image;

FIG. 22 is an example of distribution diagram of the luminance values at the respective pixels in the reproduced image during the decompression process;

FIG. 23 is an example of distribution diagram of the luminance values at the respective pixels in the reproduced image during the decompression process;

FIG. 31 is an illustration for assistance in explaining the luminance component and the two chrominance components which constitute a color image;

FIGS. 32A and 32B are illustrations for assistance in explaining the feature points on the equi-luminance contour line in the luminance component;

FIGS. 33A and 33B are illustrations for assistance in explaining the chrominance components at the feature points on the equi-luminance contour line;

FIGS. 34A and 34B are illustrations for assistance in explaining the luminance component at each pixel, the two chrominance components, and the relationship between the two chrominance components;

FIGS. 35A and 35B are illustrations for assistance in explaining the drawing of lines on the basis of the feature points on the decompression side;

FIGS. 36A and 36B are illustrations for assistance in explaining an example of deciding the unknown chrominance value at a pixel;

FIG. 37 is an illustration for assistance in explaining another example of deciding the unknown chrominance value at a pixel;

FIGS. 38A and 38B are lists for assistance in explaining the representative values in the chrominance components;

DETAILED DESCRIPTION OF THE EMBODIMENTS

The practical Contents of the multidimensional multi-valued color image compression and decompression method according to the present invention will be described hereinbelow with reference to the attached drawings.

<Application to Luminance Component>

First, the principle of the multidimensional multi-valued color image compression and decompression method will be explained hereinbelow.

Where a static monochromatic image is taken into account, if the luminance in an image is denoted by z and further the horizontal and vertical positions of the image are represented by x and y, respectively, the image luminance z can be expressed in general by the following formula (1):

$$z = f(x, y) \tag{1}$$

Figure 6:
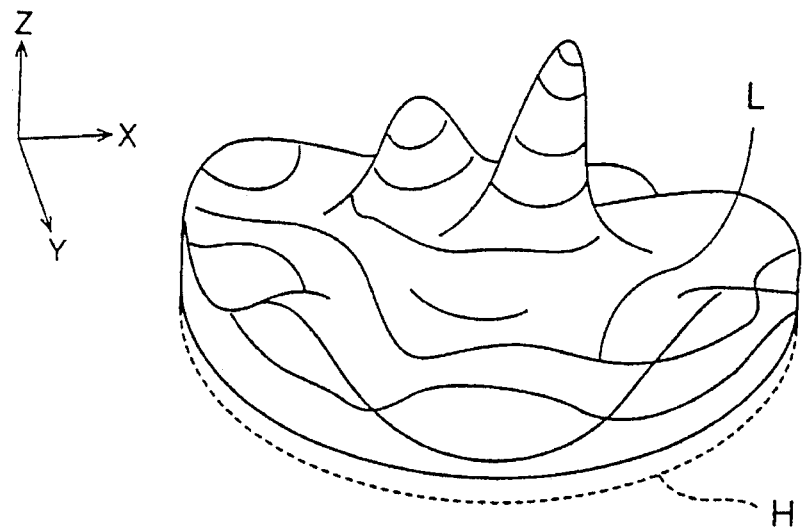
FIG. 6 is a solid diagram showing an example of a luminance function for assistance in explaining the luminance contour lines.

FIG. 6 shows an example of the luminance function. Further, if the time axis is represented by t, the luminance of a motion picture can be expressed in general by the following formula (2):

$$z = f(x, y, t) \tag{2}$$

Here, if f denotes a multidimensional function, the luminance z in an image can be expresses by the following formula (3):

$$\begin{aligned} z = \ & A_1 x + A_2 x^2 + \ldots + A_n x^n + \\ & B_1 y + B_2 y^2 + \ldots + B_n y^n + \\ & C_1 t + C_2 t^2 + \ldots + C_n t^n + \\ & D \end{aligned} \tag{3}$$

The fact that an image is transmitted is to reproduce the above-mentioned luminance function decided on the image transmitting side, on the image receiving side. In the general digital image transmissions, the luminance function is not handled as being analytical, but handled as a table function and the all the table values are transmitted. In the compression transmission, the table values themselves are coded at a high efficiency by utilization of correlation between adjacent table values. Further, the same process as described above is applied to the table values obtained after orthogonal transformation.

In the multidimensional multi-valued color image compression and decompression method according to the present invention, the luminance function is processed analytically. That is, first equi-luminance lines (the contour lines) (the equi-luminance planes in the case of three dimensions) are extracted from the image information such as the two-dimensional luminance information in the case of a static image or the three-dimensional luminance information inclusive of time axis in the case of a motion picture. In FIG. 6, an equi-luminance line is shown by L, by way of example. After that, feature points of an image are determined at such points as the positive or negative maximum points of the curvature of the extracted equi-luminance line or as points at each of which a difference between the equi-luminance line (or equi-luminance plane) and the linear approximation (or plane approximation) of the equi-luminance line (or equi-luminance plane) exceeds a predetermined threshold value. Further, the positions and the luminance values at the above-mentioned feature points are transmitted (or recorded) for image reproduction. At this time, the luminance values at the pixels which will not exert a serious influence upon the reproduced image are omitted, in order to markedly compress the amount of image information. Further, in the image decompression, the luminance function is reproduced on the basis of the transmitted feature points to reproduce, by interpolation, non-transmitted image information.

Here, the principle of the image information compression and decompression (restoration) of the multidimensional multi-valued image compression and decompression method according to the present invention will be described.

Figure 7:
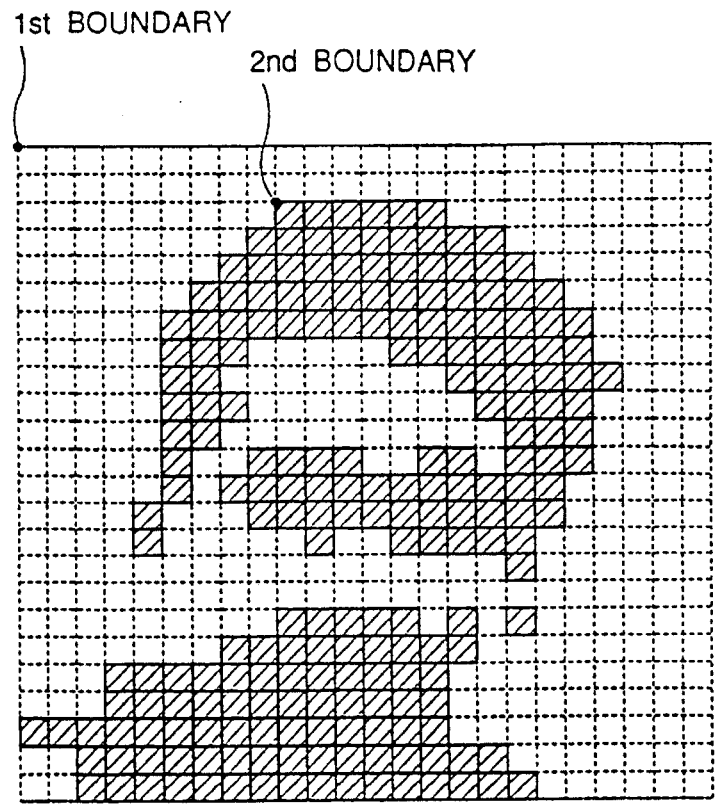
FIG. 7 is a plane view showing an example of a binary image to be compressed.

An example of multi-valued static image information compression will be explained. FIG. 7 shows an equi-luminance image obtained by slicing the luminance function as shown in FIG. 6 at a predetermined equi-luminance plane. In FIG. 7, a partition enclosed by dot lines indicates each pixel plane. Further, a pixel plane shown by oblique lines (referred to as a black pixel plane, hereinafter) represents a region (a low luminance plane) whose luminance is lower than the equi-luminance plane, and a pixel plane shown in white (referred to as a white pixel plane, hereinafter) represents a region (a high luminance plane) whose luminance is higher than the equi-luminance plane, respectively.

Figure 8:
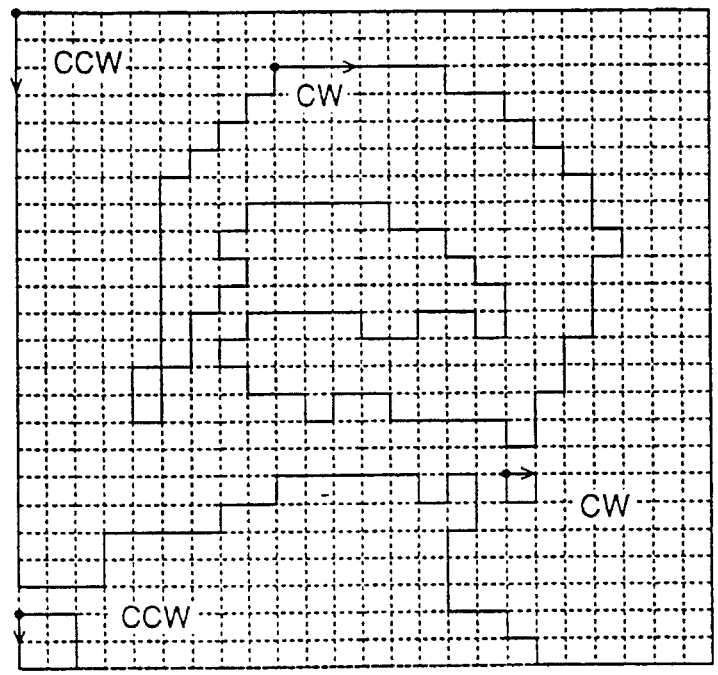
FIG. 8 is a plane view showing an example of the contour of a binary image to be compressed and obtained by tracing method.

Now, when boundary lines between the black pixel planes and the white pixel planes are traced in accordance with the contour tracing method, as disclosed in Japanese Laid-open Patent Application No. 5-35872, an image contour as shown in FIG. 8 can be obtained.

In more detail, the above-mentioned boundary lines are traced by scanning the image beginning from the upper left side point of the picture in accordance with the raster scanning sequence. Then, as shown in FIG. 7, a first boundary and a second boundary can be found.

When the boundaries are traced beginning from the above-mentioned start point under the condition that the high luminance plane is present on the left side in the trace direction, there are two cases where the trace start direction matches the horizontal scanning direction (CW: clockwise) and where the trace start direction matches the vertical scanning direction (CCW: counterclockwise).

Figure 9:
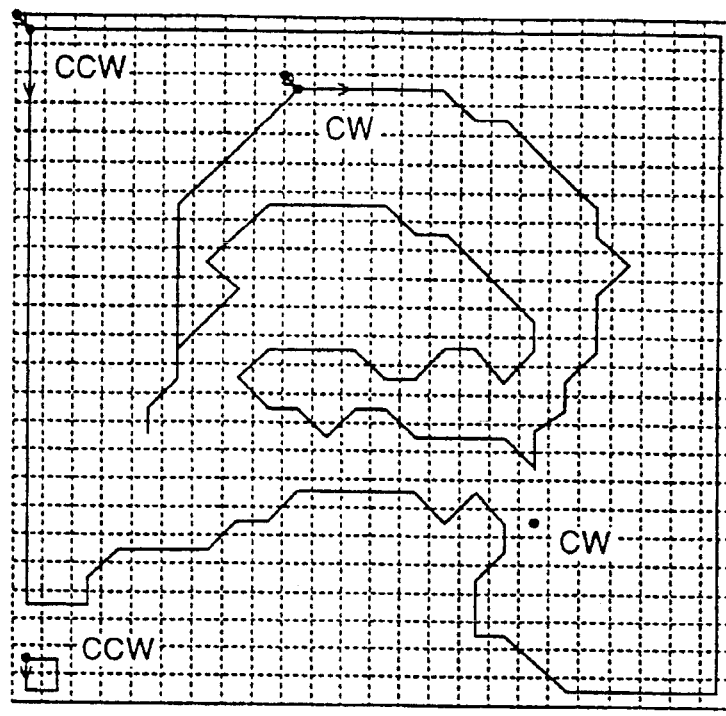
FIG. 9 is a plane view showing the state in which the contour of a binary image to be compressed and obtained on the basis of feature points ate shifted so as to pass through each pixel center.

In FIG. 8, the trace direction sort flags (CW and CCW) are attached for each traced equi-luminance line. After the contour has been obtained by tracing the pixel contours for each specific luminance value of the image luminance function, as shown in FIG. 8, the coordinates through which the specific equi-luminance line is passed (specific equi-luminance line passing-point coordinates) are shifted to the central position of each of the pixels for constituting the above-mentioned specific luminance boundary, as shown in FIG. 9.

In other words, when the tracing start direction matches the vertical scanning direction (in CCW), the equi-luminance line is shifted to the central position of each of the pixels located on the left side of the tracing direction. Further, when the tracing start direction matches the horizontal scanning direction (in CW), the equi-luminance line is shifted to the central position of each of the pixels located on the right side of the tracing direction. The above-mentioned two shift examples are both shown in FIG. 9, respectively.

As already explained, when an image is reproduced by using the contour obtained by tracing pixels as the specific luminance boundary, since one black pixel is produced on the specific side along the tracing direction, the image quality deteriorates.

On the other hand, when the coordinates (through which the specific equi-luminance line of the pixel contour obtained by the tracing as described above is passed) are shifted to the central position of each of the pixels for constituting the specific luminance boundary, the reproduced image will not deteriorate.

Next, after the start point has been fixed, the pixels on the equi-luminance line are connected in sequence by a virtual line beginning from the start point. In this case, the actual pixel (at which a distance between the virtual line and the actual pixel existing along the virtual line exceeds a predetermined allowable range) is registered as a feature point.

When the feature point is found, the operation similar to the above is repeated beginning from the found feature point as a new starting point, to register other feature points in sequence.

The above-mentioned operation is repeated to reach the starting point. After that, the obtained feature points are connected to each other to obtain a new equi-luminance line as shown in FIG. 10.

The above-mentioned operation is executed for each equi-luminance plane having each different luminance value (threshold). As a result, since the luminance function data of the original image can be reduced down to the data of each feature point group along each of the equi-luminance lines, it is possible to compress the image information.

Here, the method of decompressing (restoring) the approximate values of the luminance function by use of feature point group data will be described hereinbelow.

Figure 10:
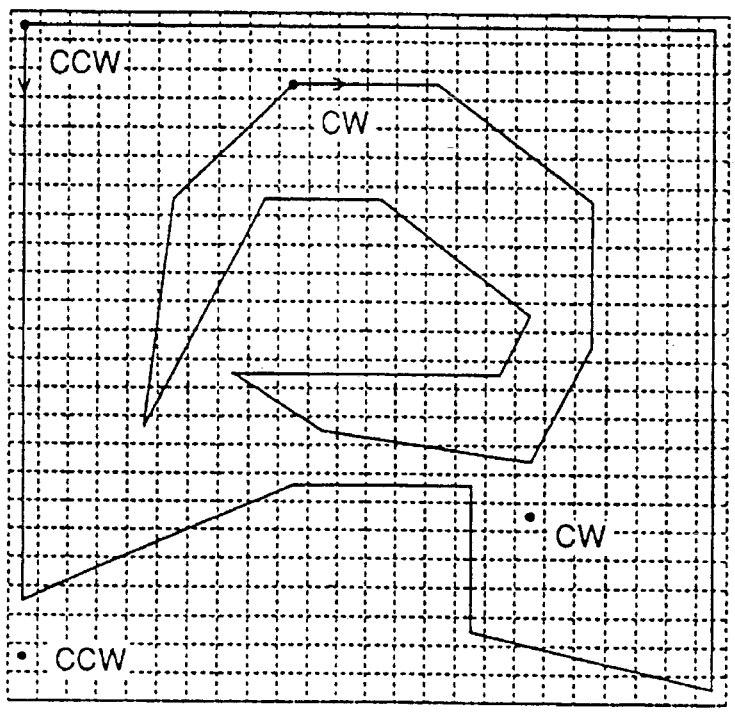
FIG. 10 is a plane view for assistance in explaining the polygonal approximation of a binary image to be compressed.

When the feature points are connected, it is possible to obtain the equi-luminance lines on the decompression side, as shown in FIG. 10.

Here, the important point is that the equi-luminance lines restored on the decompression side can be drawn or obtained by vectors designated by the end points (feature points). Accordingly, even if the pixel density of the image memory on the decompression side is different from the pixel density of the image memory on the compression side, the shape of the equi-luminance line restored on the decompression side are hardly subjected to the physical conditions of the above-mentioned difference in pixel density between the compression and decompression sides.

Figure 11:
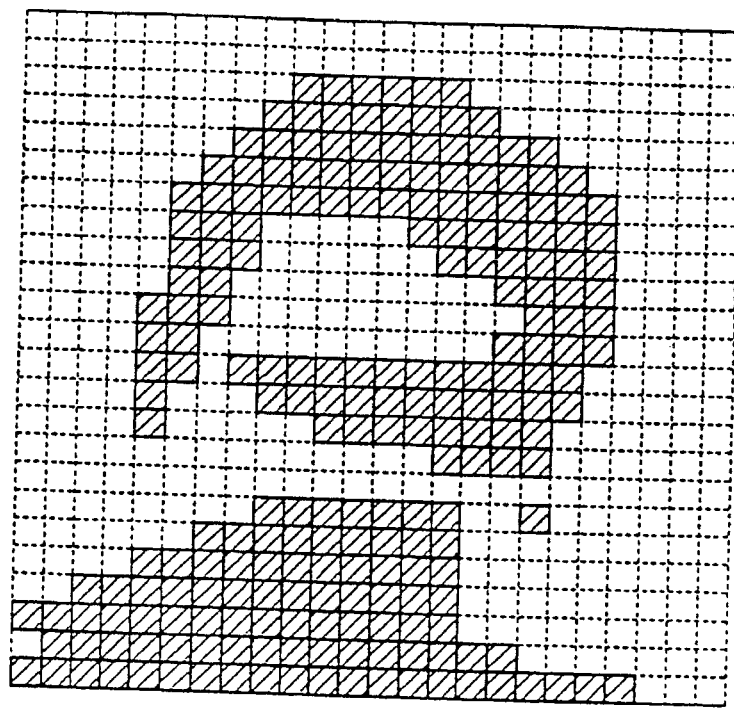
FIG. 11 is a plane view showing an example of the pixel luminance distribution of an decompressed and reproduced binary image.

After that, the pixels through which the equi-luminance lines have passed and the region on the right side (low luminance side) of the equi-luminance lines are marked by the oblique lines as shown in FIG. 11. The same is applied to a predetermined number of equi-luminance lines, respectively to form a mask for each equi-luminance line.

Figures 12A, 12B:
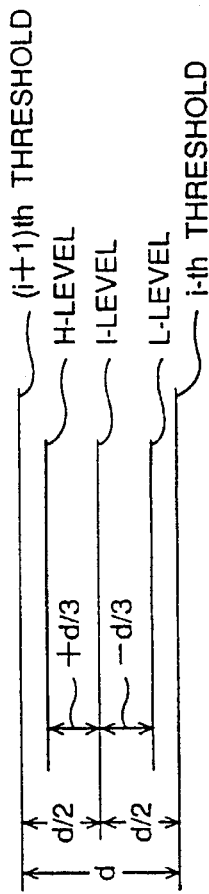
FIGS. 12A and 12B are diagrams for assistance in explaining the luminance value masks of different thresholds; and the three luminance intensity levels (high, intermediate and a low) of each of the luminance value masks.

FIG. 12B shows masks for dividing 8-bit digital luminance signals into 9-step gradation levels by way of example. Here, the luminance gradations are 256. Each mask has a predetermined respective threshold. For instance, the threshold of the mask No. 4 has a luminance gradation level of 120. When this mask is applied to the image luminance, it is possible to divide the luminance into a portion having the luminance level more than the gradation level 120 and another portion having the luminance level other than the gradation level 120.

FIG. 13 shows examples in which an image having the luminance function as shown in FIG. 6 is masked by use of 8 sorts of masks as shown in FIG. 12B. The picture represented by mask No. 1 is all colored in white. As shown in FIG. 12B, the threshold value of the mask No. 1 is set to a luminance value corresponding to the level 30 of the 256 gradations. This indicates that when this mask No. 1 is applied, the portion whose luminance value is higher than the threshold 30 is colored in white, and the portion whose luminance value is lower than the threshold 30 is colored in black. Further, in FIG. 13, the fact all the picture represented by the mask No. 1 is white indicates that there exists no portion whose luminance value is lower than the threshold 30 of the 256 gradations in the image.

The picture represented by mask No. 8 in FIG. 13 is all colored in black. As shown in FIG. 12B, the threshold value of the mask No. 8 is set to a luminance value corresponding to the level 240 of the 256 gradations. Further, in FIG. 13, the fact that all the picture represented by the mask No. 8 is black indicates that there exists no portion whose luminance value is higher than the threshold 240 of the 256 gradations in the image.

Further, in the pictures represented by the mask Nos. 2 to 7 shown in FIG. 13, a part of the picture is black and the other part thereof is white. This indicates that two portions whose luminance values are higher or lower than the threshold values of the masks coexist.

Figure 14:
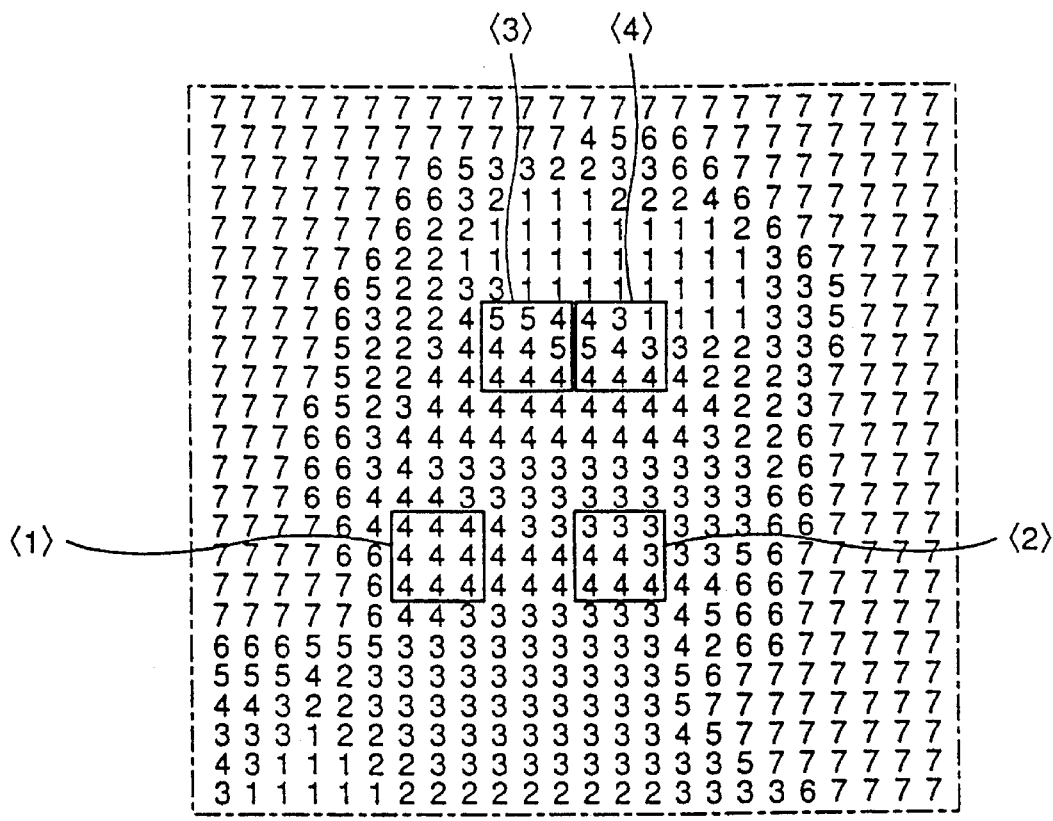
FIG. 14 is a distribution diagram of luminance values at the respective pixels in an image.

Therefore, when the eight masks as shown in FIG. 12B are overlapped one another, it is possible to reproduce an image having luminance values of nine different gradations. FIG. 14 shows the luminance distribution expressed by numerical values, in which the luminance value at the white portion of each mask is represented by the numerical value indicative of the mask number and further these eight masks are overlapped with each other.

In general, when n masks are used, the respective pixels can be divided as follows:

Mask No. 0 → Zero to 1st equi-luminance value pixels
Mask No. 1 → 1st to 2nd equi-luminance value pixels
Mask No. 2 → 2nd to 3rd equi-luminance value pixels
: : : : : : : :
Mask No. i → i-th to (i + 1)th equi-luminance value pixels
: : : : : : : :
Mask No. n → n-th to (n + 1)th equi-luminance value pixels In other words, when n masks are formed, it is possible to classified the luminance values at the respective pixels which distribute from 0 to 255 luminance gradations into (n+1) units of categories. FIG. 12B shows an example in which n=8.

Further, when the luminance values at the respective pixels included in the respective categories are represented by an intermediate value representative of each of the respective luminance ranges, it is possible to reproduce the image by use of 9-level equi-luminance lines, in the case of the example as shown in FIG. 12B.

Here, the luminance interpolation after decompression will be described hereinbelow.

In the afore-mentioned example, the original image is represented by 256 gradations. On the other hand, the luminance levels are reduced to nine levels. Therefore, when the image is decompressed by the interpolation on the basis of the reduced luminance gradations of nine luminance levels, it is impossible to reproduce the image in a sufficiently high quality.

Therefore, in order to improve the image quality, before the luminance values are interpolated for reproduction, the respective luminance values used as values at the interpolation ends are corrected as follows, without simply using the intermediate value of each category as the interpolation end values:

Eight adjacent pixels around a central pixel to be decided are observed.

(1) When the luminaries values at the adjacent pixels are equal to the luminance value at the central pixel, [undecided] mark is put to the luminance value at the central pixel.

(2) When the luminance values at the adjacent pixels are not higher than the luminance value at the central pixel, a [low] mark is put to the luminance value central pixel.

(3) When the luminance values at the adjacent pixels are not lower than the luminance value at the central pixel, a [high] mark is put to the luminance value at the central pixel.

(4) When the relationship in luminance value between the adjacent pixels and the central pixel is other than the above (1) to (3), an [intermediate] mark is put to the central pixel.

Figure 15:
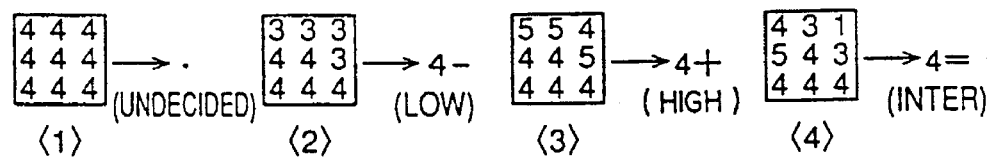
FIG. 15 is an illustration for assistance in explaining four states determined on the basis of the relationship between the luminance value at one central pixel and the luminance values at the eight other pixels adjacent to the central pixel in the image.

These examples are shown in FIG. 14. In each of the pixel groups composed of 9-pixels and denoted by <>, when the central pixel is noted, <1> corresponds to the above rule (1); <2> corresponds to the above rule (2); <3> corresponds to the above rule (3); and <4> corresponds to the above rule (4), respectively. In accordance with these rules, when the marks are denoted as follows: the [undecided] is denoted by [.]; the [low] is denoted by [−]; the [high] is denoted by [+]; and the [intermediate] is denoted by [=], respectively, the respective pixel groups as shown by <1> to <4> in FIG. 14 can be expressed as shown in FIG. 15. Further, FIG. 16 shows the results obtained by correcting all the pixels as shown in FIG. 14, in accordance with the rules from (1) to (4) above.

Figure 16:
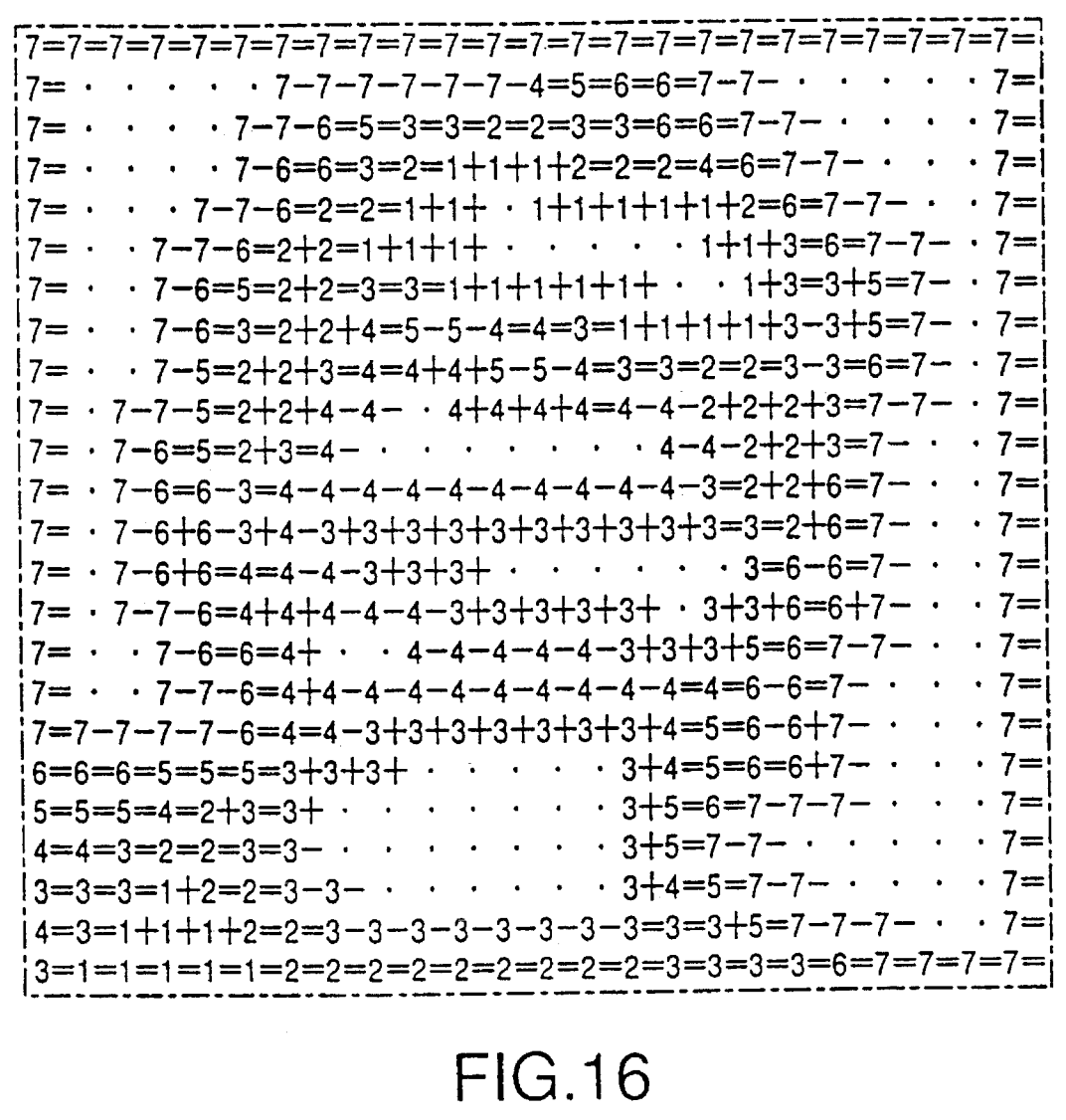

In FIG. 16, [low (−)] indicates that the luminance value must be adjusted being shifted to the lower luminance value; [high (+)] indicates that the luminance value must be adjusted being shifted to the higher luminance value; [intermediate (=)] indicates that the luminance value is adopted as it is; and [undecided (.)] indicates that the luminance value must be interpolated.

FIGS. 18A to 18D, 18E to 18H, 18I to 18L show these corrections. In the drawings, <1> to <4> represent the relationship between the central pixel and the adjacent pixels (the same as shown in FIG. 15); FIGS. 18A to 18D represent the observation results of the adjacent pixels corresponding to <1> to <4>, respectively; FIGS. 18E to 18H represent the luminance values (before adjustment) of the respective pixels by use of bar chart heights; and FIGS. 18I to 18L represent the luminance values (after adjustment) of the respective pixels by use of bar chart heights.

Figure 18A:
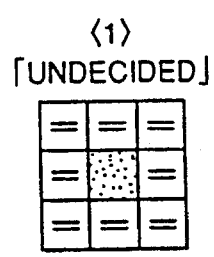
FIGS. 18A to 18D, 18F to 18H and 18I to 18L are illustrations for assistance in explaining the specific states determined by the relationship between the luminance value at one central pixel and the luminance values at the other eight pixels adjacent to the central pixel in an image.
Figure 18B:
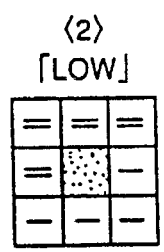
Figure 18C:
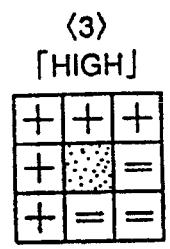
Figure 18D:
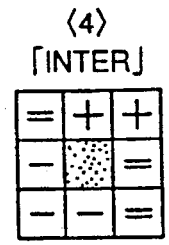
Figure 18E:
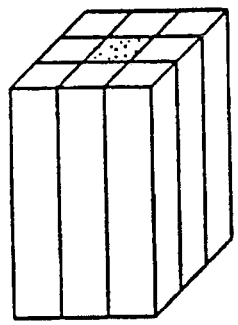
Figure 18F:
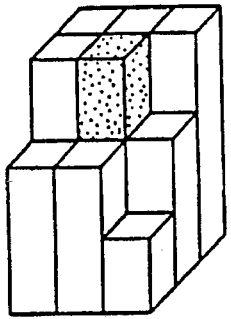
Figure 18G:
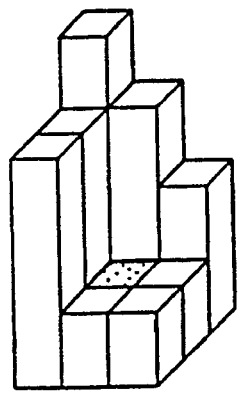
Figure 18H:
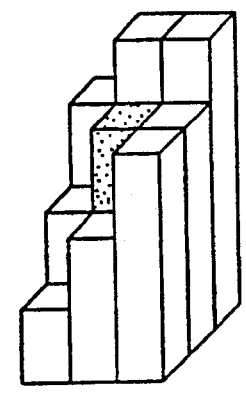
Figure 18I:
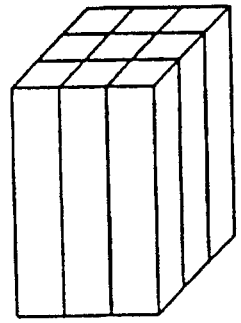
Figure 18J:
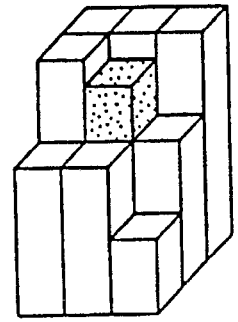
Figure 18K:
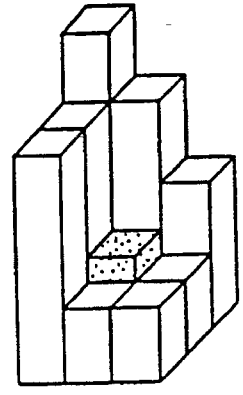
Figure 18L:
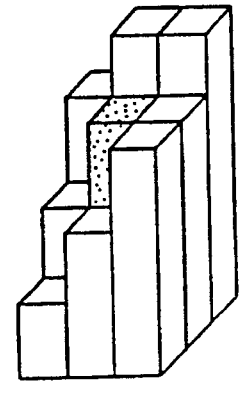

In the case of FIG. 18A, since all the luminance values at the adjacent pixels are equal to each other, the luminance value at the central pixel is undecided (corresponding to <1>,). In the case of FIG. 18B, since the luminance values at the adjacent pixels are not higher than that at the central pixel, the luminance value at the central pixel is shifted to [low] side (corresponding to <2>,). In the case of FIG. 18C, since the luminance values at the adjacent pixels are not lower than that at the central pixel, the luminance value at the central pixel is shifted to [high] side (corresponding to <3>). In the case of FIG. 18D other than the above cases, the luminance value at the central pixel is set to [intermediate] (corresponding to <4>).

Figure 19:
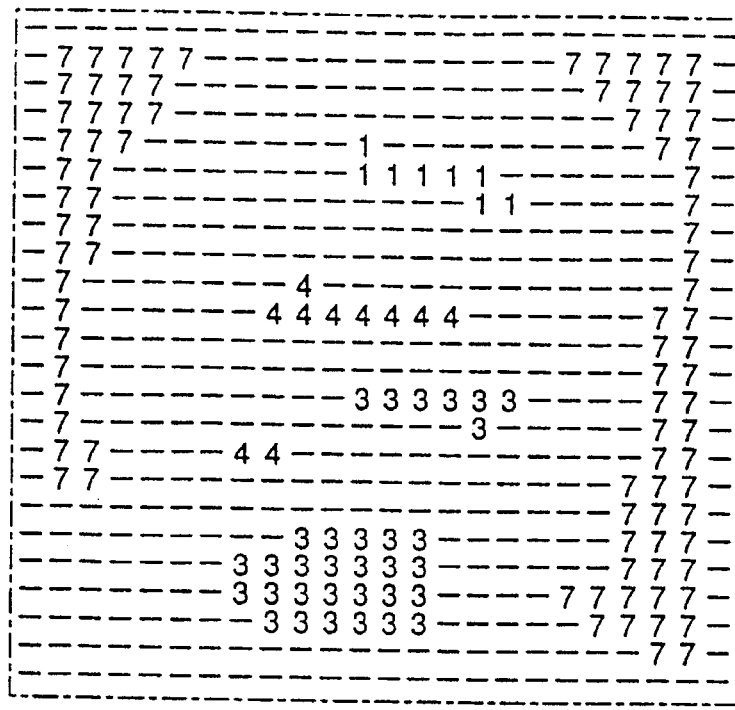
FIG. 19 is a distribution diagram showing luminance values at the respective pixels under specific conditions in an image.
Figure 20:
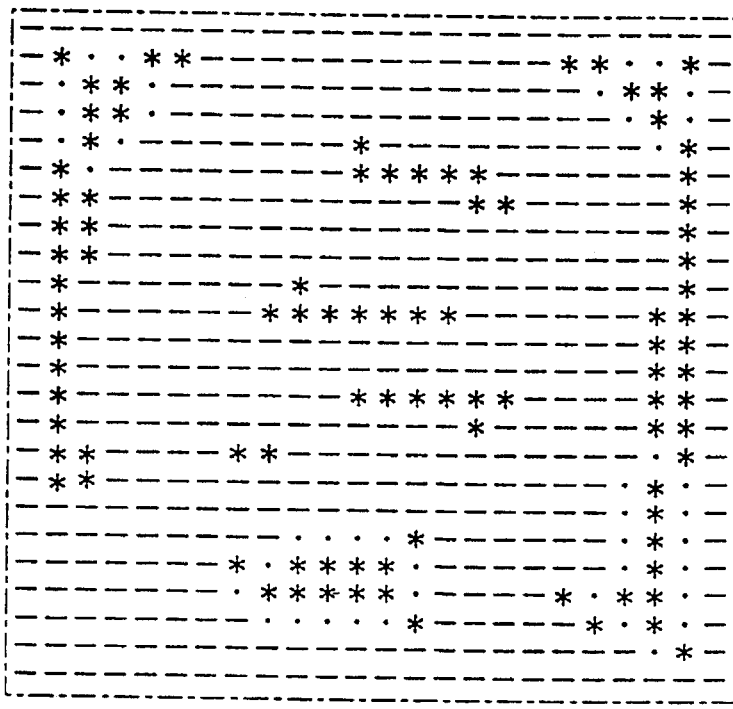
FIG. 20 is a skeletal distribution diagram in the image.
Figures 21, 22:
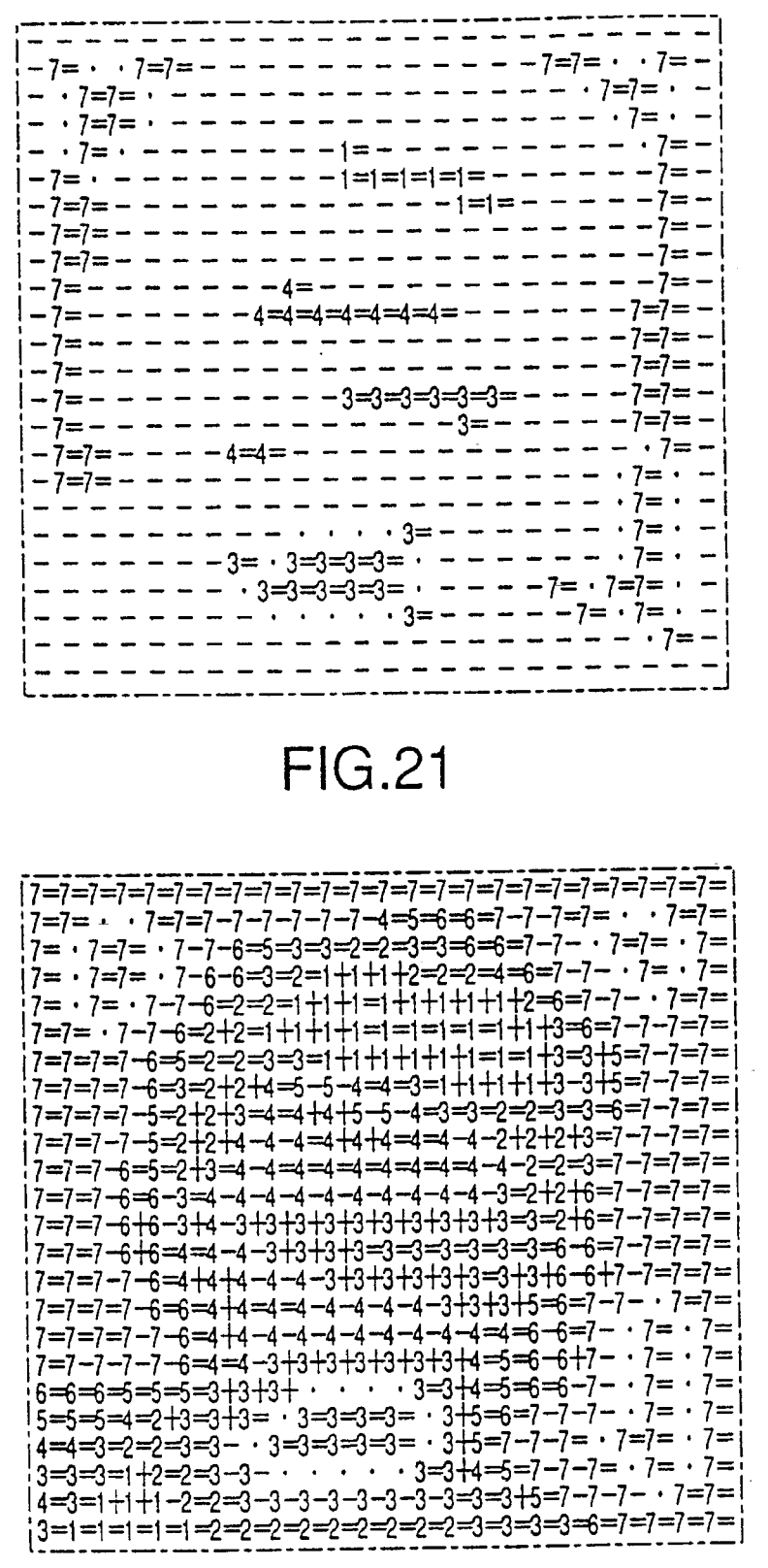

After that, the central lines (a point group of equi-distances from the ends of the respective regions) in the [undecided] regions are extracted, and [intermediate] marks are put on the pixels on these lines. These steps are shown in FIGS. 19, 20, 21 and 22. That is, FIG. 19 shows the luminance values before adjustment at only the [undecided] regions; FIG. 20 shows the regions to be decided by putting a mark [*] thereon by abstracting the practical luminance values. FIG. 21 shows the [intermediate] marks ([=]) and the luminance values at the pixels on the central lines in the corresponding regions. FIG. 22 shows all the marks expressed in accordance with the rules from (1) to (4).

Here, the rule is decided that the mask thresholds shown in FIG. 12B are allocated to the above-mentioned marks as follows (See, FIG. 12A.):

1) The threshold of the intermediate-level luminance value of the corresponding luminance category is allocated to [intermediate].

2) The threshold of the low-level luminance value of the corresponding luminance category is allocated to [low]. Here, low-level luminance value=intermediate-level luminance value—(category luminance range/3).

3) The threshold of the high-level luminance value of the corresponding luminance category is allocated to [high].

Here, high-level luminance value=intermediate-level luminance value + (category luminance range/3).

Figure 23:
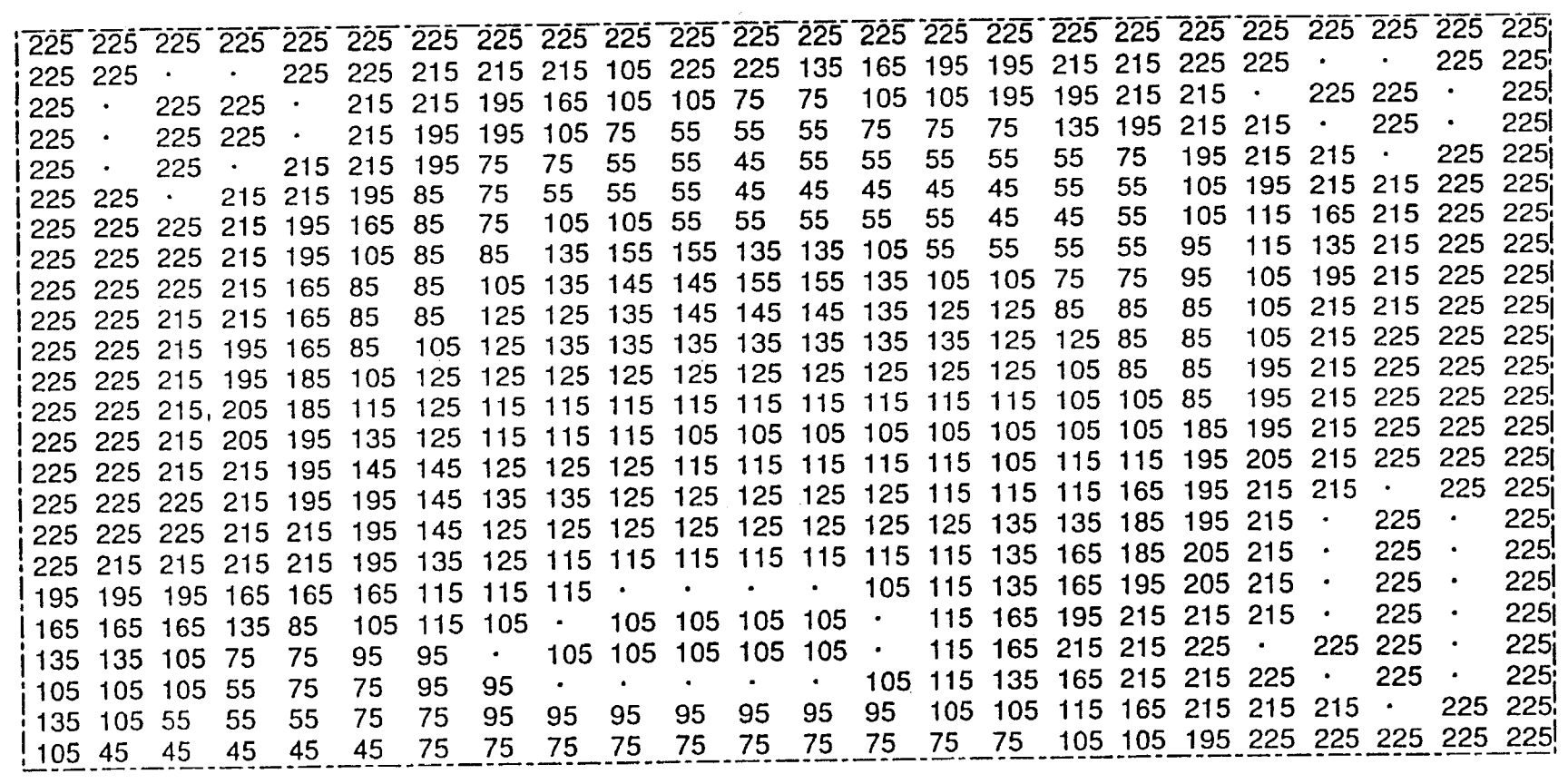
Figure 25:
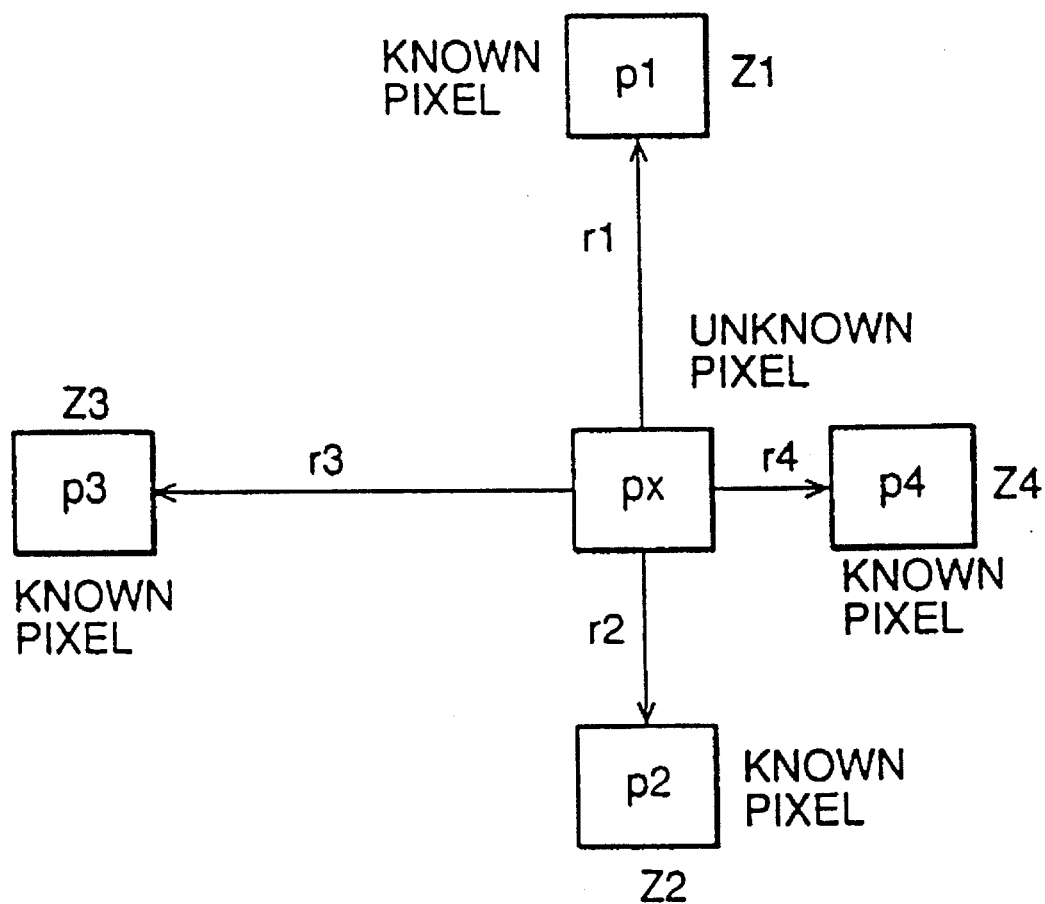
FIG. 25 is a diagram for assistance in explaining an example for deciding an undecided luminance value at a pixel on the basis of four adjacent pixels.

In FIG. 23, the [undecided] marks [.] still remain after the above-mentioned correction. These luminance values at the marked pixels can be obtained on the basis of the interpolation principle as shown in FIG. 25. In the interpolation method, the unknown luminance value can be obtained on the basis of the known luminance values at the pixels obtained by retrieving in both the vertical and horizontal scanning directions beginning from the unknown pixel (e.g., px in FIG. 25) and on the basis of the predetermined distances. In more detail, the luminance value at the luminance-undecided pixel (px) is decided in accordance with the linear interpolation method on basis of the luminance values (z1 and z2, or z3 and z4) end the distances (r1 and r2, or r3 and r4) at the luminance-known pixels (p1 and p2, or p3 and p4) locating on both ends of the line extending in a predetermined direction from the luminance-undecided pixel px. Further, the obtained linear interpolation values are averaged as the interpolated luminance value at the luminance-undecided pixel.

Figure 26:
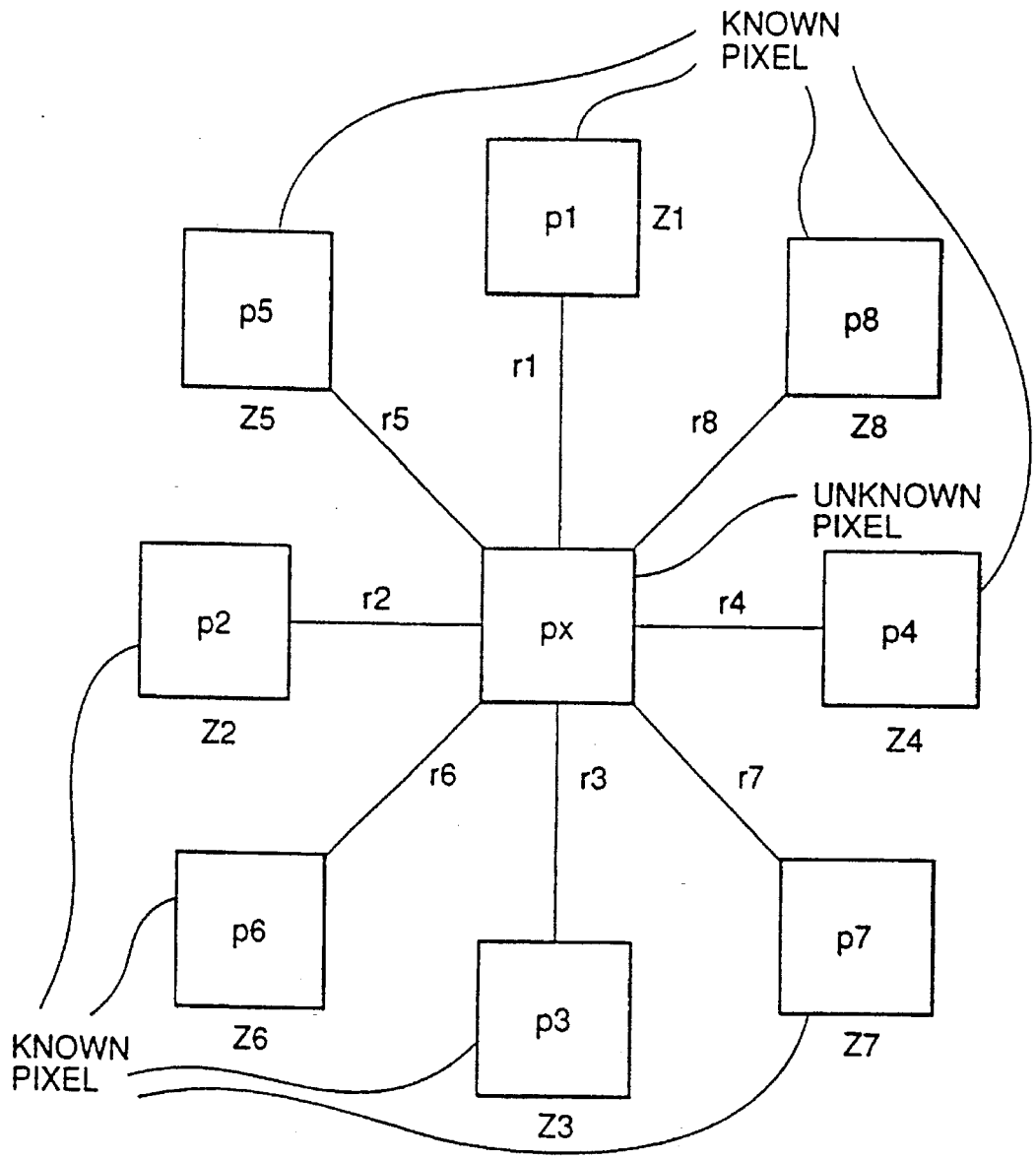
FIG. 26 is a diagram for assistance in explaining an example for deciding an undecided luminance values at a pixel on the basis of eight adjacent pixels.

In actual interpolation, the luminance value at luminance-unknown pixel can be obtained as shown in FIG. 26. First, the pixels of the known luminance values are retrieved in the vertical and the horizontal directions and the intermediate direction between both the vertical and horizontal directions beginning from the pixel px. By this retrieval, the distances from the unknown pixel px and the known pixels and the luminance values at the known pixels can be obtained. FIG. 26 shows the respective luminance values (z1 to z8) at the respective pixels (p1 to p8 and the respective distance values (r1 to r8) between the respective pixels (p1 to p8) and the unknown pixel (px). By using these values, the luminance value zx at the unknown pixel px can be obtained as.

$$zx=\Sigma(zi/ri)/\Sigma(1/ri) \quad (4)$$

FIGS. 17A to 17F show the principle of the interpolation in a more understandeble one-dimensional way, in which the one-dimensional luminance distribution curve alter decompression (e.g., the luminance distribution curve along the pixels arranged on single horizontal scanning line) is shown. In FIGS. 17A to 17C, the abscissa indicates the pixel positions, and the ordinate indicates the luminance values. Further, the bar chart indicates the luminance value obtained by the afore-mentioned masks. Further, the black points indicate the luminance values at the mask boundary pixels, and the line connecting the black points indicates the luminance distribution curve obtained after interpolation. Further, FIGS. 17D, 17E and 17F represent the luminance distribution curves corresponding to FIGS. 17A, 17B and 17C, respectively. In FIG. 17A, only the higher values of the mask are shown, and the remaining luminance values are interpolated, which corresponds to the method of determining only the luminance values at the pixels along the equi-luminance line. In this method, stepped portions are produced in the luminance distribution curve as shown in FIG. 17D.

In contrast with this, FIG. 17B shows the method where the luminance values are adjusted on the basis of [low], [intermediate] and [high]. In this method, the smooth luminance distribution curve can be obtained, as shown FIG. 17E.

Further, FIG. 17C shows the method where the [intermediate] value is set to the pixel at the middle line. In this method, the luminance values can be restored under consideration of slopes toward the top or bottom of the luminance value, so that the more smoother luminance distribution curve can be obtained, as shown in FIG. 17F.

Figure 24:
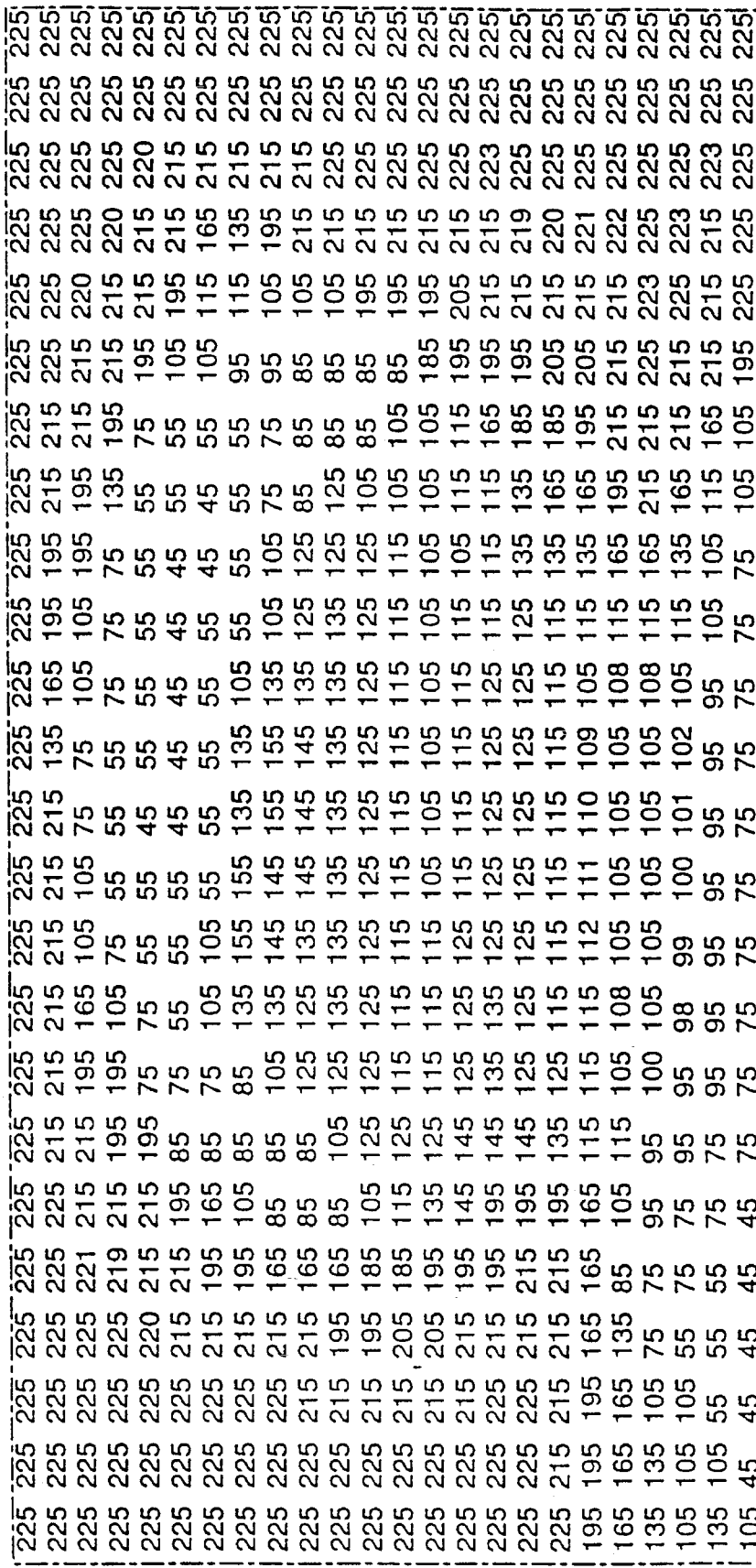
FIG. 24 is an example of distribution diagram of the luminance values at the respective pixels in the reproduced image during the decompression process.

When three adjacent pixels are selected from the two adjacent equi-luminance lines in a plurality of equi-luminance lines and further when the luminance value between the two equi-luminance lines is interpolated on an interpolation plane formed on the basis of the three pixels, it is possible to obtain the one-dimensional luminance distribution curve, as shown in FIG. 17A. FIG. 24 shows the linear interpolation results obtained as described above. Further, FIG. 17C shows the same results in one-dimensional way.

A practical construction for realizing the multi-dimensional multi-valued color image compression and decompression method according to the present invention will be described hereinbelow with reference to the attached drawings. Further, although only the two-dimensional compression and decompression method will be described in detail in the following description, the method according to the present invention can be of course applied to the three-dimensional compression and decompression method.

Figure 1:
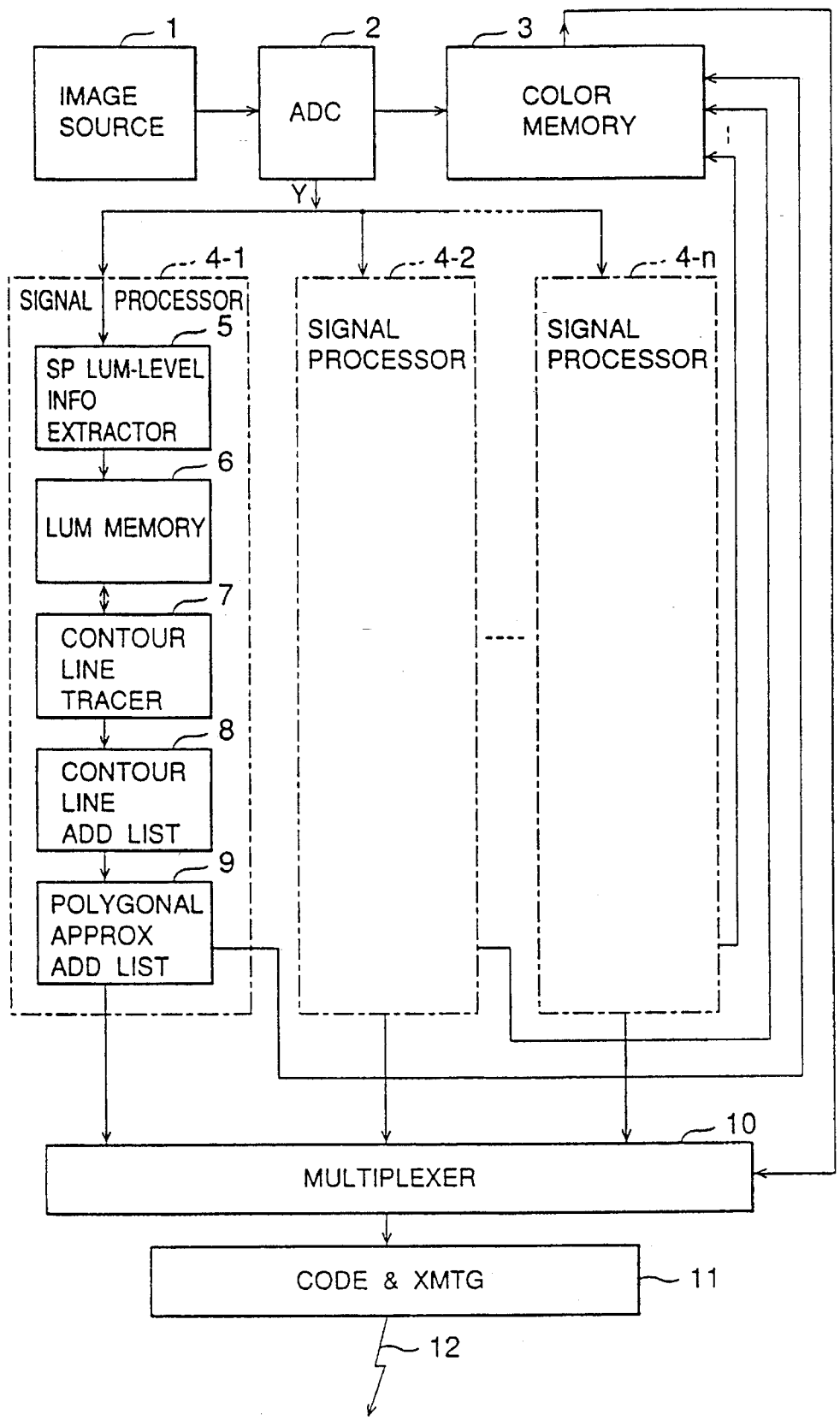
FIG. 1 is a block diagram showing a signal processing section for processing the luminance component on compression side, for realizing the multidimensional multi-valued color image compression and decompression method according to the present invention.

In the compression side construction of the multi-dimensional multi-valued color image compression and decompression method according to the present invention shown in FIG. 1, an image source (e.g., TV camera) 1 generates video signals in accordance with the predetermined standard TV system. As this image source 1, any types of video signal generating apparatus can be used, as far as the image information to be compressed and decompressed by the multidimensional multi-valued color image compression and decompression method according to the present invention can be generated. The image source 1 shown in FIG. 1 is of the type which can generate three primary color signals. The three primary color signals generated by the image source 1 are applied to an ADC (analog-digital conversion section) 2.

The ADC 2 decomposes the luminance signal for each image into a predetermined number of pixels (e.g., 512 pixels in the image horizontal direction and 480 pixels in the image vertical direction) along the image horizontal and vertical directions, and generates digital luminance signals Y of a predetermined number (e.g., 8-bit) of bits. The generated digital luminance signals Y are applied to each of signal processing sections 4-1, 4-2, . . . 4-n, respectively. Further, digital chrominance signals corresponding to the pixels are formed as the chrominance signals, and the formed digital chrominance signals are supplied to a color memory 3.

Each practical construction of the signal processing sections 4-1, 4-2, . . . 4-n is shown in the signal processing section 4-1 enclosed by a dot-dashed line frame. In more detail, a specific luminance level information extract section 5 binarizes the image information to be compressed on the basks of a predetermined luminance threshold different from each other according to each of the signal processing sections 4-1, 4-2, . . . , 4-n, and outputs the binarized image information together with the image addresses.

Figure 2:
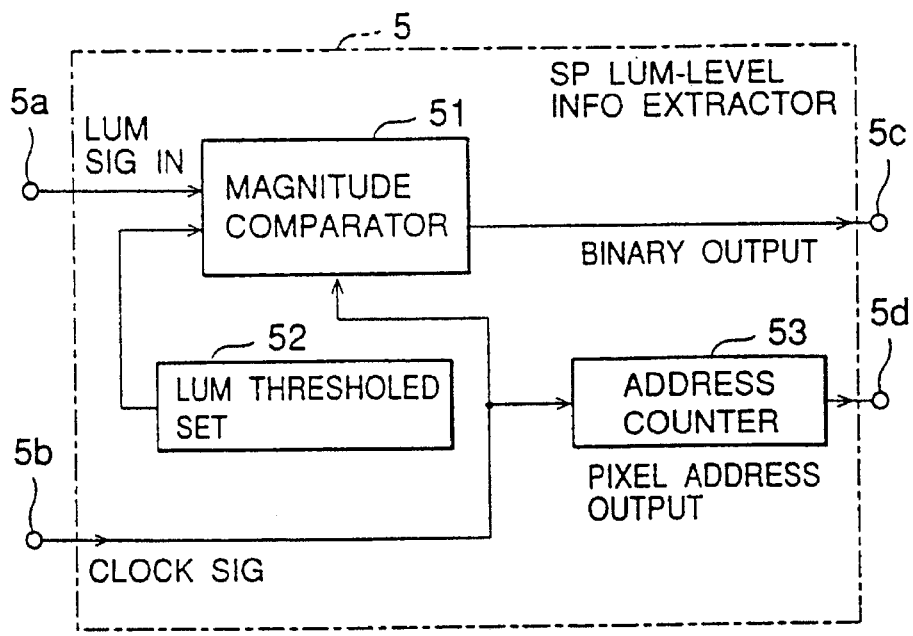
FIG. 2 is a block diagram showing a structural example of an extraction section for extracting the specific luminance level information in the signal processing section for processing the luminance component on the compression side.

FIG. 2 shows a structural example of the specific luminance level information extract section 5. In FIG. 2, the digital luminance signals Y are applied from the ADC 2 through an input terminal 5a. In addition, a clock signal is applied to the same section 5 from a controller (not shown) through another input terminal 5b.

In more detail, the digital luminance signals Y applied to the specific luminance level information extract section 5 is compared with a specific luminance threshold applied by a luminance threshold setting section 52 by a comparator (magnitude comparator) 51, and then outputted through an output terminal 5c as the binary outputs of the luminance signals Y. To the above-mentioned luminance threshold Betting section 52, a predetermined binary threshold value is set from a ROM, a DIP switch, a fuse array, etc. These luminance thresholds are previously determined for operating the multidimensional multi-valued color image compression and decompression system, for instance such as the first to eighth thresholds as shown in FIG. 12B by way of example.

Figure 3:
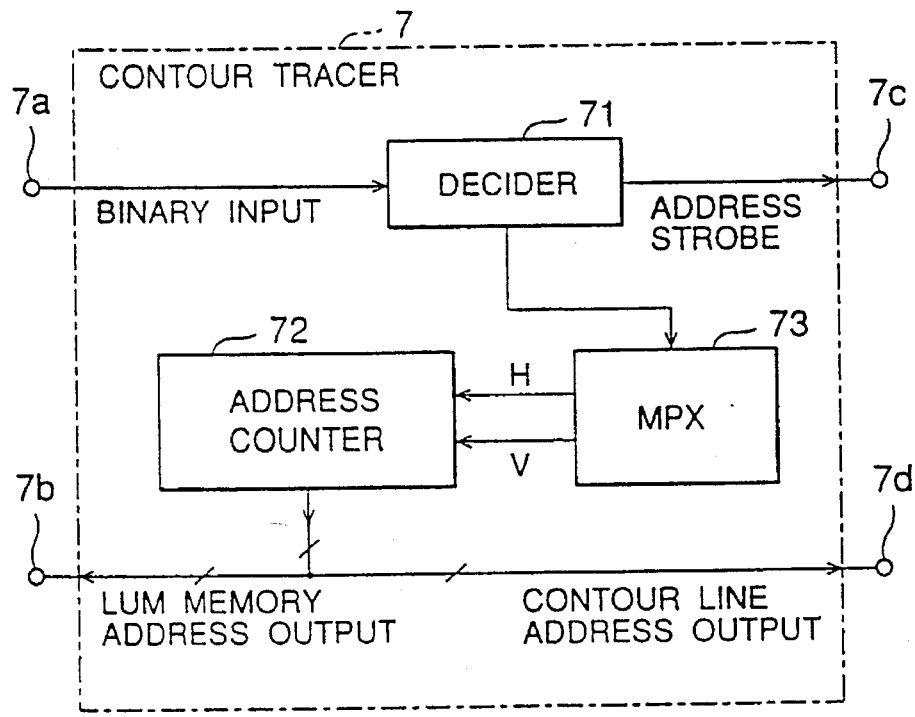
FIG. 3 is a block diagram showing a structural example of a contour line tracer in the signal processing section for processing the luminance component on the compression side.

The binary outputs of the digital luminance signals outputted by the specific luminance level information extract section 5 are stored in a luminance memory 6. The binary outputs of the digital luminance signals stored in the luminance memory 6 are read on the basks of addresses designated by the luminance memory address output signals outputted by a address counter 72 (shown in FIG. 3) of a contour line tracer 7, and then supplied to a decide section 71 (as shown in FIG. 3) of the contour line tracer 7.

Now, the binary digital luminance signals outputted by the specific luminance level information extract section 5 are the binary signals representative of specific luminance thresholds, for instance such as to obtain the luminance state as shown in FIG. 7. The binary signals read from the luminance memory 6 are applied to the decide section 71 (as shown in FIG. 3). The decide section 71 starts scanning the pixel group (such as a pixel group binarized as shown in FIG. 7), in accordance with the raster scanning sequence beginning from the upper left corner of the picture. Further, when a first boundary is found, the decide section 71 starts to trace the contour of the pixels having the specific luminance value beginning from the first boundary. Here, when the trace direction is determined in such e way that the higher luminance plane is always present on the left side thereof, there are two cases where the trace start direction matches the horizontal scanning direction (CW: clockwise) and where the trace start direction matches the vertical scanning direction (CCW: counterclockwise). The decide section 71 traces the pixel contour as described above, and transmits the output signal (address strobe) indicative of the contour line information through the output terminal 7c (shown in FIG. 3).

Information H and V indicative of the stepping hysteresis (the trace direction changes to the horizontal direction and the vertical direction) obtained when tracing the contour of the pixels having the above-mentioned specific luminance value are applied to an address counter 72 via a multiplexer 73. Therefore, the address counter 72 outputs a sequential address train on the basis of the stepping hysteresis in sequence as the luminance memory address output through the output terminal 7b (shown in FIG. 3), and further as the contour line address output through the output terminal 7d (shown in FIG. 3).

The contour line information output signals (address strobe through the terminal 7c in FIG. 3) and the contour line address output (through the terminal 7d in FIG. 3) are both applied to the contour line address last 8 (shown in FIG. 1). After having stored the above-mentioned contour line address outputs, the contour line address list 8 shifts the coordinates through which the specific equi-luminance line is passed to each of the central positions at the pixels for constituting the above-mentioned specific luminance boundary, as shown in FIG. 9.

Figure 4:
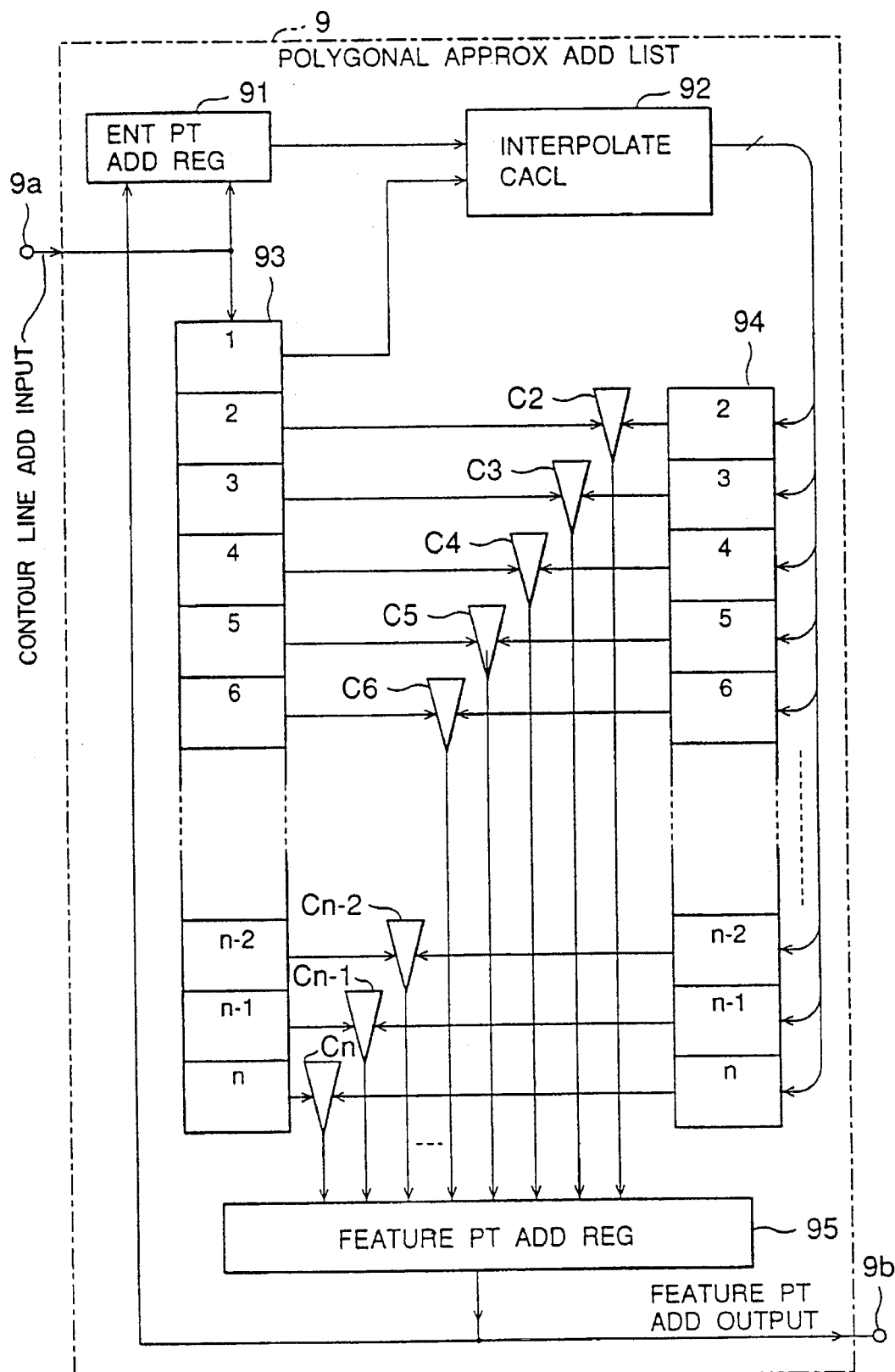
FIG. 4 is a block diagram showing a structural example of a polygonal approximation address list in the signal processing section for processing the luminance component on the compression side.

The address outputs of the central positions at the respective pixels for constituting the specific luminance boundary outputted by the contour address list 8 are supplied to a polygonal approximation address list 9, respectively. FIG. 4 shows a practical example of this polygonal approximation address list 9. In FIG. 4, the address information indicative of the central positions at the respective pixels for constituting the specific luminance boundary outputted by the contour line address list 8 are inputted through an input terminal 9a of the polygonal approximation address list 9. These inputted address information through the input terminal 9a is supplied to an end point address register 91 and a shift register 93.

The output of the end-point address register 91 is applied to an interpolation address calculation section 92. To this interpolation address calculation section 92, address information indicative of the first memory section of the shift register 93 is also given.

The interpolation address calculation section 92 replaces a distance between each feature point and the interpolation straight line, with a simplified value for comparison. Here, now, the image horizontal scanning direction is determined as Yv axis and the image vertical scanning direction is determined as Yv. Here, when the intersection angle between the interpolation line and the horizontal scanning direction Xh axis is less than 45 degrees, the distance between the interpolation line and the feature point on the vertical scanning direction Yv axis is set to the simplified value. On the other hand, when the intersection angle between the interpolation line and the vertical scanning direction Yv axis is an angle except 45 degrees, the distance between the interpolation line and the feature point on the horizontal scanning direction Xh axis is set to the simplified value.

The threshold of the intersection angle is determined to be 45 degrees on condition that one pixel is square. In other words, when the absolute value of the intersection angle is less than 45 degrees (or other than the above), the contour line address information is inputted to the first accumulation section of the shift register 93 in sequence, and further held thereat in sequence. The interpolation address group at the positions which correspond to the horizontal scanning direction (Xh axis) addresses (or to the vertical scanning direction (Yv axis) addresses) (e.g., the address values calculated on the basis of the endpoint addresses and the sequential address information stored in the first accumulation section of the shift register 93) are supplied to the register 94 as the interpolation addresses.

Further, the contour line pixel addresses stored in the shift register 93 and the interpolation addresses stored in the register 94 are applied to comparison extractors C2, C3, . . . Cn, respectively, as shown in FIG. 4.

When a difference in absolute value between the contour line address and the register interpolation address exceeds a predetermined value, each of the comparison extractors C2, C3, . . . Cn outputs the comparison result to the feature point address register 95, so that the address at the feature point is stored in the feature point address register 95. At the same time, the address value at the feature point is given to the end point address register 91 as the new end point address value.

The address information indicative of the central positions at the respective pixels for constituting the specific luminance boundary (supplied to the input terminal 9a of the polygonal approximation address list 9) is the tracing start point address information. Upon start of the operation of the polygonal approximation address list 9, the tracing start point address information is stored in the end point address register 91, and in the first accumulation section 1 of the shift register 93 at the same time. Since the sequential contour line address group outputted by the con,our line address list 8 is kept supplied to the polygonal approximation address list 9, the stored contents are shifted in sequence in the respective accumulation sections 1, 2, 3, . . . , n of the shift register 93.

At this time, the stored contents of the end point address register 91 are not changed. Only the contents stored in the first accumulation section 1 of the shift register 93 are outputted as an updated linear interpolation value address group.

As described above, whenever a linear interpolation value address group is outputted, under consideration of the slope of the straight line, the interpolation value address group whose horizontal (or vertical) direction addresses correspond to the respective accumulation sections 1, 2, . . . , n of the shift register 93 are outputted to the accumulation sections 2, 3, . . . , n of the register 94.

When a difference in absolute value (which corresponds to a distance between the contour line and the interpolation straight line) between the input information supplied by each of the accumulation sections 2, 3, . . . ,n and the input information supplied by each of the accumulation sections 2, 3, . . . , n of the register 94 exceeds a predetermined value, each of the comparison extractors C1, C2, C3, . . . , Cn recognizes the contour line address point as a feature point, respectively. The recognized feature points are stored in the feature point address register 95.

When a plurality of the comparison extractors C2, C3, . . . , Cn output the feature point information at the same time, the con, our line address nearer to the address value stored in the end point address register 91 is adopted as a new end point address. The adopted address value is stored in the feature point address register 95, and further the new end point address is stored in the end point address register 91. In the above case, even if a plurality of feature points are neglected, it is unnecessary to restore the feature point information as the feature point addresses.

The feature point address group outputted separately from the respective signal processing sections 4-1, 4-2, . . . 4-n shown in FIG. 1 for each different luminance threshold are given to a coding and transmitting section 11 via the multiplexer 10. To this coding and transmitting section 11, the chrominance signal components are also supplied from the color memory 3 via the multiplexer 10. Therefore, the coding and transmitting section 11 codes these supplied signals in accordance with a known efficient coding (e.g., Huffman code), and transmits (or record) the coded signals to a receive side (or reproduce side) via a transmission line (or recording medium) 12.

Further, in the embodiment as described above, feature points are decided as follows:

Starting from the already-detacted feature point pixel, the pixels are traced in a certain direction along a contour line (a Contour plane in the case of the three-dimensional luminance information). In this case, when a distance between a virtual straight line connected between the arrival pixel and the feature point and another virtual straight line connected between the previous arrival pixel and the feature point exceeds a predetermined threshold, the arrival pixel is decided as the feature point.

In the embodiment of the present invention, however, the feature point address group can be also decided for each different luminance threshold as follows: (1) the pixels at which the positive or negative,curvature of the equi-luminance line (contour line) (the equi-luminance plane in the case of the three-dimensional luminance information) of the luminance function becomes the maximum are decided as the feature points or (2) the pixels at which the curvature of the equi-luminance line (contour line) (the equi-luminance plane in the case of the tree-dimensional luminance information) exceed a predetermined threshold angle are decided as the feature points.

The decompression side of the multidimensional multi-valued color image compression and decompression method according to the present invention will be described hereinbelow with reference to the attached drawings. That is, the case where the luminance function of an original image is decompressed or restored will be explained.

Figure 5:
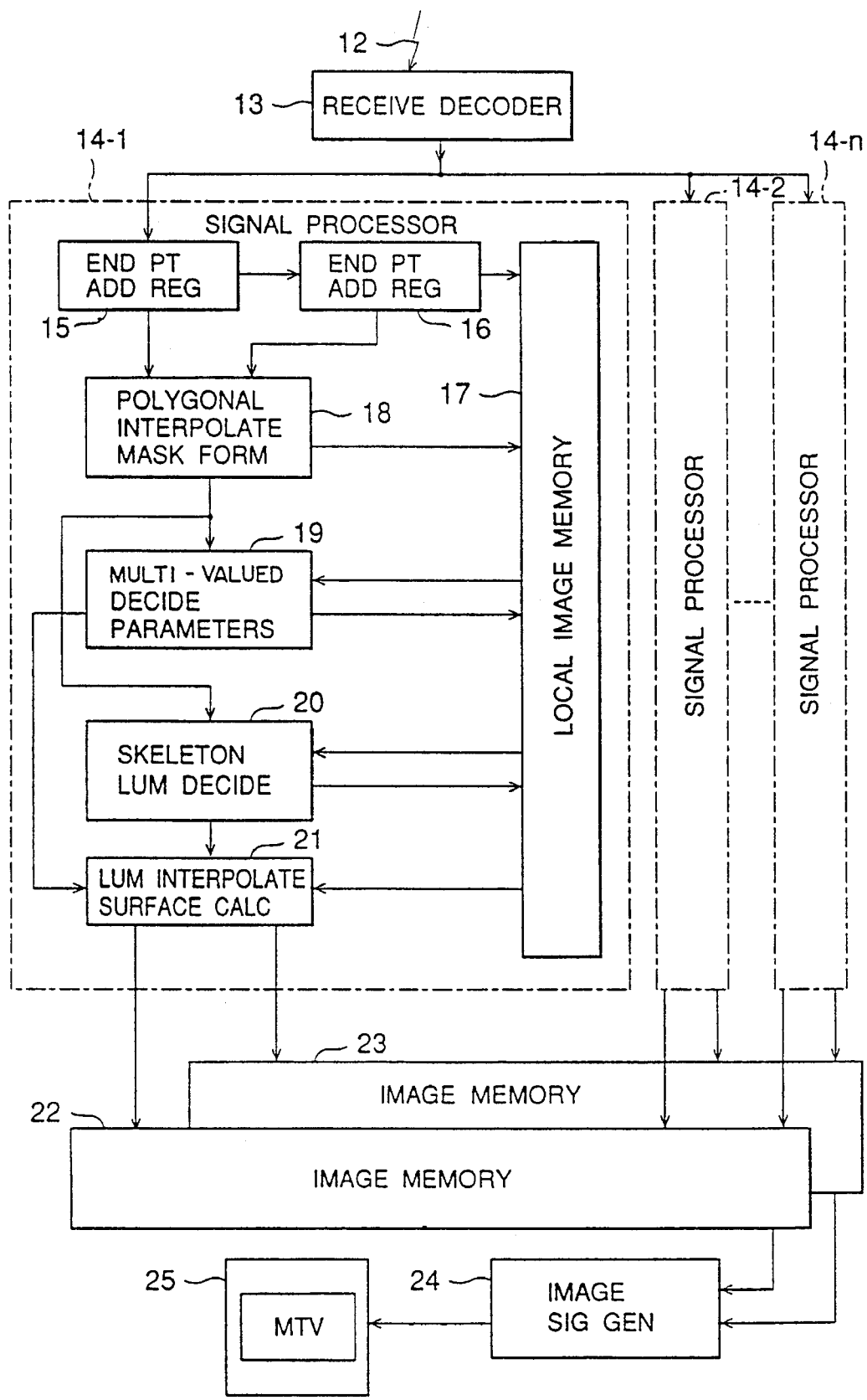
FIG. 5 is a block diagram showing a signal processing section for processing the luminance component on the decompression side, for realizing the multidimensional multi-valued color image compression and decompression method according to the present invention.

In FIG. 5, a receive decoder 13 decodes the high-efficiency coded signals supplied through the transmission line 12 (or the recording medium), and then gives these decoded signals to signal processing circuits 14-1, 14-2, . . . 14-n, respectively. A plurality of these signal processing circuits 14-1, 14-2, . . . 14-n are provided so as to one-to-one correspond to a plurality of the signal processing circuits 4-1, 4-2, . . . 4-n provided on the compression side of the multidimensional multi-valued color image compression and decompression method according to the present invention.

The above-mentioned receive decoder 13 decodes the high-efficiency signals compressed by the signal processing sections 4-1, 4-2, . . . , 4-n, and distributes these compressed and decoded signals to the signal processing sections 14-1, 14-2, . . . , 14-n, respectively.

The feature point addresses supplied from the receive decoder 13 to the signal processing circuits 14-1 in sequence are stored in an end point address register 15 and another end point address register 16. Further, the stored feature point addresses are given from the end point address register 15 and the end point address register 16 to a polygonal interpolation mask forming section 18, as the both end point addresses.

The polygonal interpolation mask forming section 18 calculates the addresses at the two end point pixels for linear interpolation, and stores the calculated addresses in a multi-pore local image memory 17 at a designated luminance value.

Further, when the new feature address is supplied from the receive decoder 13 to the signal processing circuit 14-1, the supplied new feature point address is stored in the end point address register 15 as the new endpoint address. At the same time, the end point address stored in the end point address register 15 is shifted to the end point address register 16. Therefore, the polygonal interpolation mask forming section 18 calculates the addresses at the two end point pixels for linear interpolation. The calculated addresses are stored in the multi-port local image memory 17 as a designated luminance value.

Whenever the new feature point address is supplied from the receive decoder 13 to the signal processing circuit 14-1, the polygonal interpolation mask forming section 18 repeats the above-mentioned operation to calculate new interpolation lines in sequence, and stores the calculated addresses in the local image memory 17 as a designated luminance.

Further, when a closed curve is formed by the above-mentioned interpolation lines, the polygonal interpolation mask forming section 18 forms a mask of a specific luminance level by allocating the inside of the closed curve to a designated luminance in the local image memory 17.

As described above, it is possible to form a mask composed of binary (light (or bright) and shade (or dark)) symbols for each of the specific luminance threshold values in such a way that a bright region defined by use of the equi-luminance line as a boundary is marked by the light symbol and a dark region defined by use of the equi-luminance line as a boundary is marked by the dark symbol.

As described above, each mask is formed for each corresponding luminance threshold value in each of the signal processing circuits 14-1, 14-2, . . . , 14-n.

After the above-mentioned operation has been completed by the polygonal interpolation mask forming section 18, a multi-value decide operator 19 and a skeleton luminance decide section 20 operate in such a way that the luminance plane of the local image memory 17 can be changed into the multi-valued luminance plane. In more detail, as already explained, in order to improve the image quality to be reproduced, when the luminance values are interpolated for reproduction, the luminance value at each interpolation end point is corrected as follows, without simply setting the luminance values at both end points to an intermediate value of the category:

First, the masks are arranged in the order of intensities of the luminance threshold values, and the region between the adjacent masks is marked by an intermediate luminance value between the luminance threshold values of the two adjacent masks.

Next, eight adjacent pixels around a central pixel to be studied are observed (1) When the luminance values at the adjacent pixels are equal to the luminance value at the central pixel, a [undecided] mark is put to the luminance value at the central pixel.

(2) When the luminance values at the adjacent pixels are not higher than the luminance value at the central pixel, a [low] mark is put to the luminance value at the central pixel.

(3) When the luminance values at the adjacent pixels are not lower than the luminance value at the central pixel, a [high] mark is put to the luminance value at the central pixel.

(4) When the relationship in luminance value between the adjacent pixels and the central pixel is other than the above (1)to (3), an [intermediate] mark is put to the central pixel.

Further, the skeleton luminance decide section 20 operates in such a way that the central lines in the [undecided] regions (skeleton: a point group equidistant away from the region end) can be extracted and the luminance value at the pixel on the central line in the above-mentioned region is set to an intermediate value of the luminance threshold values of both the masks (as shown in FIGS. 13 to 16). The decided luminance values are stored in the local image memory 17.

As described above, the luminance decide operation can be completed by the multi-value decide operator 19 and the skeleton luminance decide section 20. After that, the luminance interpolation plane calculate section 21 decides the luminance values at the luminance undecided pixels as [intermediate level], [low level], and [high level], as shown in FIG. 12A. Or else, after the luminance value at the pixel on the central line of the region is set to an intermediate value between the luminance threshold values of both the masks, the luminance values at the remaining luminance undecided pixels are decided by the linear interpolation method, as shown in FIG. 25. In more detail, the luminance value at the luminance-undecided pixel (px) is decided in accordance with the linear interpolation method on the basis of the luminance values (z1 and z2, or z3 and z4) and the distances (r1 and r2, or r3 and r4) at the luminance-known pixels (p1 and p2, or p3 and p4) locating on both ends of the lane extending in a predetermined direction from the luminance-undecided pixel px. In practice, as shown in FIG. 26, 8 pixels decompressing in four directions are taken into account. That is, the luminance value at the luminance-undecided pixel is extending in accordance with the linear interpolation method by use of the luminance values and the distances the luminance-known pixels located on both the ends of each of straight lines extending in predetermined different directions from the luminance undecided pixel. Or else, the luminance value at the luminance-undecided pixel is decided by use of a plane-interpolated value obtained by the luminance values at three luminance known pixels adjacent to the luminance undecided pixel.

The image signals decompressed through the signal processing by the respective signal processing circuits 14-1, 14-2, . . . , 14-n are stored in the image memories 22 and 23. These two image memories 22 and 23 are so operated as to repeat the write operation and the read operation alternately in sequence with respect to each other. The image signals read from the image memories 22 and 23 are supplied to a video signal generator 24. The video signal generator 24 generates video signals conforming to a TV system of a specific scanning standard, and supplies the generated video signals to a monitor TV, so that a reproduced image can be displayed on a display picture of the monitor TV 25.

<Application to Chrominance Components>

First, the principle of processing the chrominance components in the multidimensional multi-valued color image compression and decompression method according to the present invention will be described hereinbelow.

The color image information can be divided into the luminance component and the chrominance components of sorts, as shown in FIG. 31. That is, the chrominance components can be divided into the chrominance U (B-Y) and the chrominance V (R-Y).

In the case where the image information is expressed by the RGB components, the image information is converted into the luminance component and the chrominance components of two sorts.

With respect to the separated luminance component, the equi-luminance lines are extracted for each of a plurality of luminance thresholds, in accordance with the method as already explained in detail under <Application to luminance component>. On the basis of the equi-luminance lines, the feature points are extracted by the polygonal approximation and in accordance with the predetermined rules. The luminance component information of an image is compressed down to the coordinates and the luminance values at these feature points.

FIGS. 32A and 32B show an example, in which an equi-luminance line obtained by a certain threshold is drawn by the feature points. In the drawing, the feature point information is a series of coordinates as (x1, y1), y2), . . . , (x5, y5).

Here, as show in FIGS. 33A and 33B, the chrominance component values at pixels whose image addresses are represented by a series of the above-mentioned coordinates are retrieved. In this case, in correspondence to a series of The coordinates of the feature points, is is possible to obtain (u1, u2, . . . , u5) as the choromince components U (B-Y) and further (v1, v2 . . . , v5) as the chrominance components V (R-Y). By adding these values coordinate values (x1, y1), (x2, y2), . . . , (x5, y5) of feature points, a series of new four-dimensional data can be obtained as (x1, y1, u1, v1), (x2, y2, u2, v2), . . . , (x5, y5, u5, v5).

In other words, the color image information can be compressed end coded to a series of the four-dimensional data. Further, in the actual image, since the sampled chrominance components are often used, when the chrominance components corresponding to the coordinate values obtained on the basis of the equi-luminance line are required, it is necessary to retrieve the chrominance components on the basis of the addresses obtained by reducing the x-coordinate value and y-coordinate value by half.

Or else, it is necessary to obtain the chrominance component values by developing the chrominance components into a plurality of pixels (whose number is equivalent that of the luminance component values) in accordance with the interpolation calculations as shown in FIGS. 34A and 34B. FIGS. 34A and 34B show a method of obtaining some unknown chrominance components on the basis of the obtained chrominance components (U in this case).

As described above, the principle of allocating the chrominance components to the feature points of the equi-luminance lines has been explained. In practice, however, the following correction is added:

At the boundaries at which color changes, when only single equi-luminance line is extracted, the chrominance value is decided to any one of both the colors or an intermediate color between both the colors. This implies that the color of the original image cannot be reproduced. In particular, when the number of the feature points of equi-luminance line is small, the image quality deteriorates markedly. To overcome this problem, chrominance component values on both sides of the equi-luminance ling are added as the chrominance component values on the equi-luminance line.

When a series of the coordinate points as (x1, y1, (x2, y2), . . . , (x5, y5) are obtained as the feature point information as shown in FIGS. 32A and 32B, there are retrieved the chrominance component values u11, u12 . . . . , u15 and v11, v12, . . . , v15 at the pixels located on the right sides of these corresponding coordinate values and the chrominance component values ur1, ur2 . . . , ur5 end vr1, vr2 . . . , vr5 at the pixels located on the left sides of these corresponding coordinate values from chrominance components.

Here, the positions of both right and left side pixels can be obtained as follows: since the equi-luminance line is obtained by connecting a series of coordinate points, both the right and left sides of each feature point along the advance direction are obtained by deciding each directional vector at each feature point.

Figure 39:
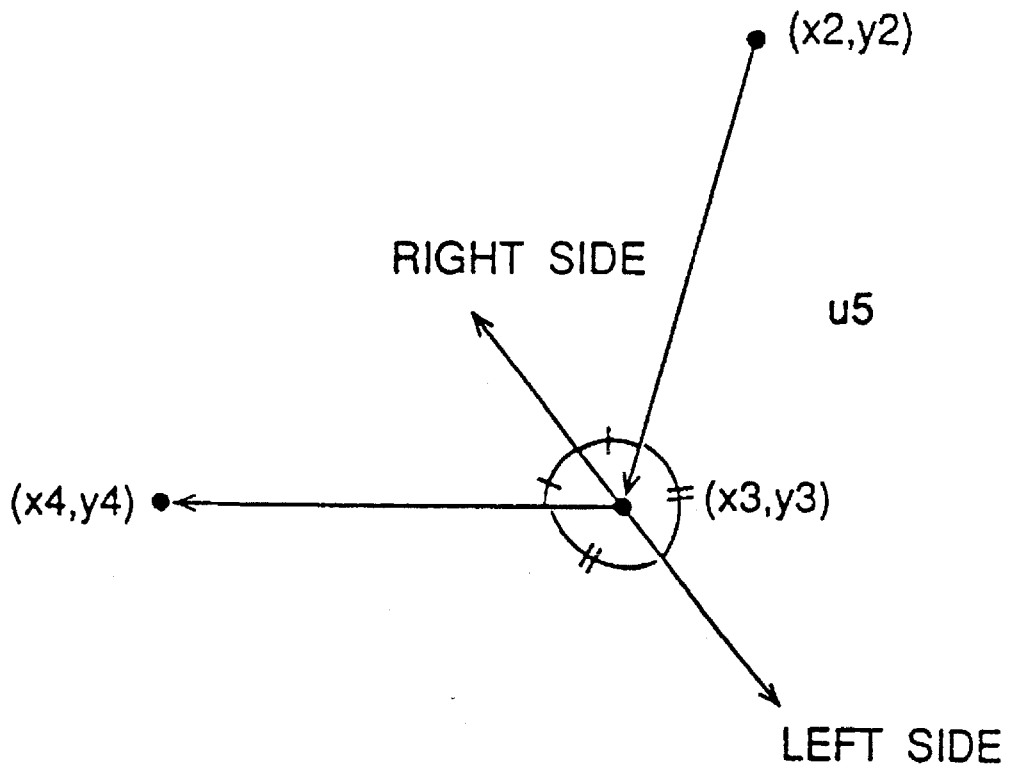
FIG. 39 is an illustration for assistance in explaining the method of deciding the right and left pixels on both sides of a feature point.
Figure 40:
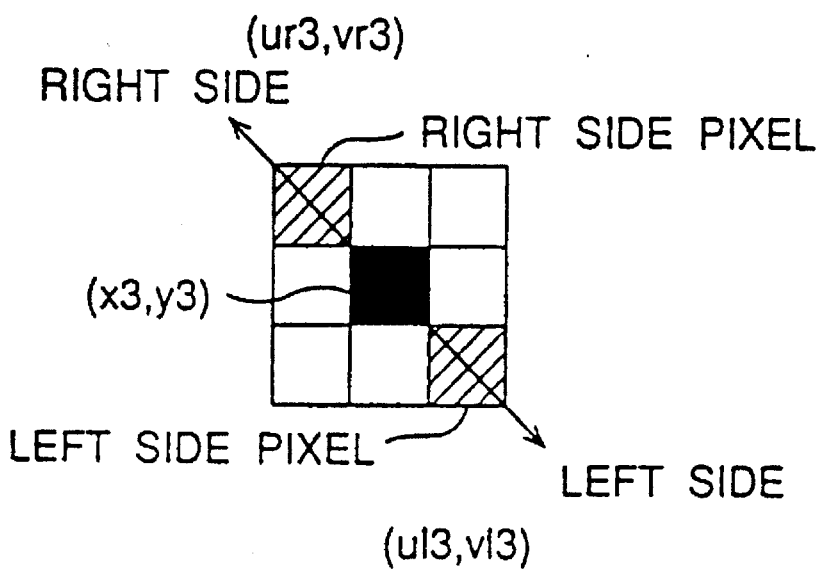
FIG. 40 is another illustration for assistance in explaining the method of deciding the right and left pixels on both sides of a feature
Figure 41:
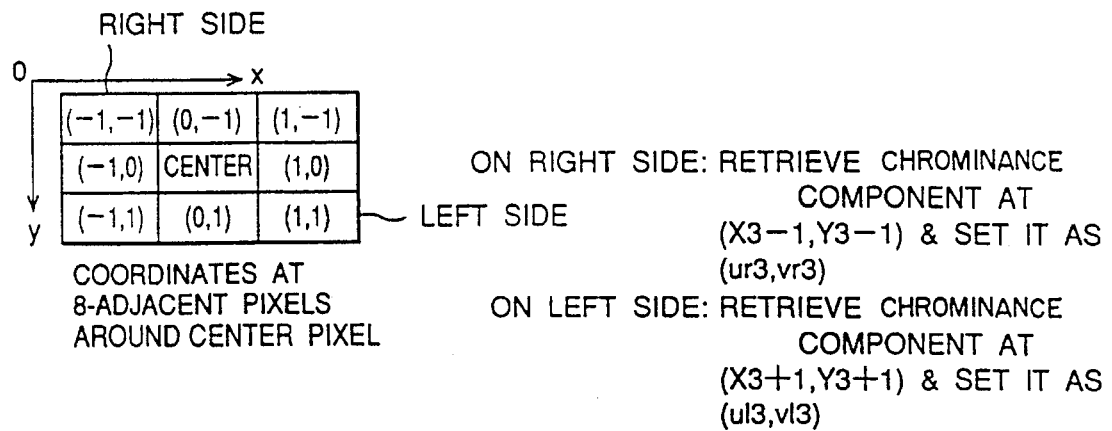
FIG. 41 is the other illustration for assistance in explaining the method of deciding the right and left pixels on both sides of a feature point.

FIG. 39 shows the partial coordinate points (x2, y2 (x3, y3) and (x4, y4) of the equi-luminance line shown in FIGS. 32A and 32B. Here, when noting the coordinate point (x3, y3), a bisector extends from the coordinate point (x3, y3) between the two other coordinate points (x2, y2) and (x4, y4). On the basis of this bisector, the right end left pixels can Be decided, and eight adjacent pixel positions are determined around the coordinate point (x3, y3) as shown in FIG. 40, in which the right and left side pixels of the coordinate point (x3, y3) are shown. Further, FIG. 41 shows the coordinate values of the eight adjacent pixels around the central pixel.

Figure 42A:
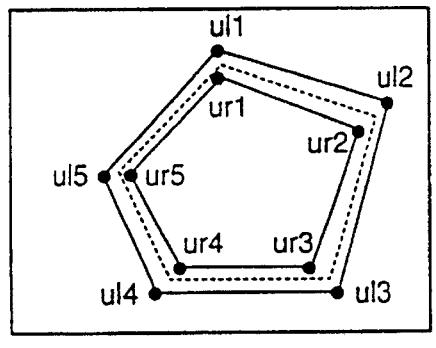
FIGS. 42A and 42B are illustrations for assistance in explaining the chrominance components on the equi-luminance contour line at the feature point having the right and left pixels on both sides thereof, respectively.
Figure 42B:
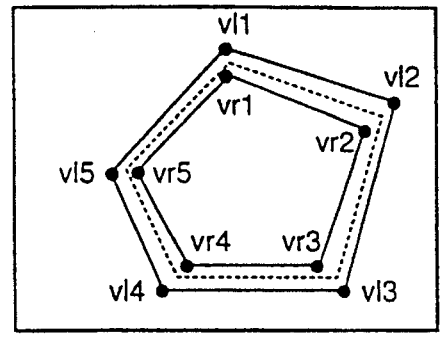

As described above, the right and left pixels are decided around each of the feature points. On the basis of these chrominance components (as shown in FIGS. 42A and 42B) at these pixels, it is possible to form a new sequence of six-dimensional data as (x1, y1, u11, v11, ur1, vr1), (x2, y2, u12, v12, ur2, vr2), . . . , (x5, y5, u15, v15, ur5, vr5), with the result that the color image can be compress and coded.

The method of using representative values for the chrominance components at some pixels will be described hereinbelow. This method is adopted to reduce the amount of information of the chrominance components added at the respective feature points, by neglecting the upper and lower small values to such an extent as not to exert harmful influence upon the-quality of the restored image.

First, an allowable value for the Chrominance component values is determined. The appropriate error allowable value is obtained empirically on the basis of the amount of transmitted information and the required quality of the restored image. Here, the chrominance components (u1, v1) at the start point (x1, y1), of each loop on the equi-luminance line are determined as the initial values. Further, when the difference between the chrominance components (u2, v2) at the succeeding feature point (x2, y2) and the chrominance components at the preceding point does not exceed the allowable value, the chrominance component values at the preceding point are used as they are.

The above-mentioned processing is executed in sequence along a series of the feature points. However, when the difference in the chrominance components exceeds the allowable range, the chrominance component values at the current feature point are adopted as the new representative value, until the processing reaches the end point of the loop. FIGS., 38A and 38B show a practical example, in which the chrominance components can be reduced, respectively when the allowable value is set to five. In FIGS. 38A and 38B, the chrominance values u change at the feature points 1, 6, 7, 10 and 12, and the chrominance values v change at the feature points 1, 6, 7 and 10. Only when the chrominance components change during transmission of the image information, since the chrominance components are transmitted, it is possible to reduce the amount of information to be transmitted markedly.

The method of restoring the chrominance-component image on the basis of the feature point data coded as described above will be described hereinbelow.

By connecting a series of the coordinate points transmitted as the feature points on the equi-luminance line, it is possible to draw the lines on the decompression side, as shown in FIGS. 35A and 35B. Here, in Order to restore the chrominance Component image, it is necessary to obtain the chrominance component image on the basis of the chrominance component values belonging to the feature points (pixels) on the lines. By the method using the representative values as described above, since the chrominance component values can be decided at all the feature points, the chrominance values at the end points of the drawn line are determined by use of the values at the respective feature points. On the other hand, the value at an intermediate pixel between the two end points can be decided in accordance with the linear interpolation between both the end points, as shown in FIGS. 36A and 36B, in which u' (unknown) is decided by u1 and u2 (both known). After the lines have been drawn on the basis of all the feature points of the equi-luminance line and further the chrominance component values have been decided, the chrominance component values at the unknown pixels are obtained in accordance with the linear interpolation by retrieving the pixels having the known chrominance components in the horizontal, vertical and oblique directions and by using the obtained values at the adjacent pixels and the distances between them, as shown in FIG. 37. The above-mentioned processing is executed in both the chrominance components U and V all over the image picture. The obtained chrominance components restored in accordance with the method as described above are synthesized with the restored luminance component to obtain a reproduced color image.

Further, the method of restoring the chrominance components on the basis of the feature point data including the chrominance components at the right and left pixels will be described hereinbelow.

The equi-luminance line can be drawn on the decompression side by connecting a series of the coordinate points transmitted as the feature points of the equi-luminance line. Here, since the chrominance component values at both the right and left pixels are added, when the line is drawn, the pixel positions shifted to the right and left sides are obtained to draw lines on both the right and left sides thereof. Further, after the corresponding chrominance component values are set to the end points, respectively, the other chrominance component values on the line can be decided in accordance with the linear interpolation. Further, the chrominance component value at the unknown pixel can be obtained by the interpolation in the same way as with the case of using a single chrominance component value.

The above-mentioned processing is executed for both the chrominance components U and V. Both the obtained chrominance components are synthesized with the luminance component to restore a color image.

A practical structural example for realizing the multidimensional multi-valued color image compression and decompression method according to the present invention will be described hereinbelow in detail.

Figure 27:
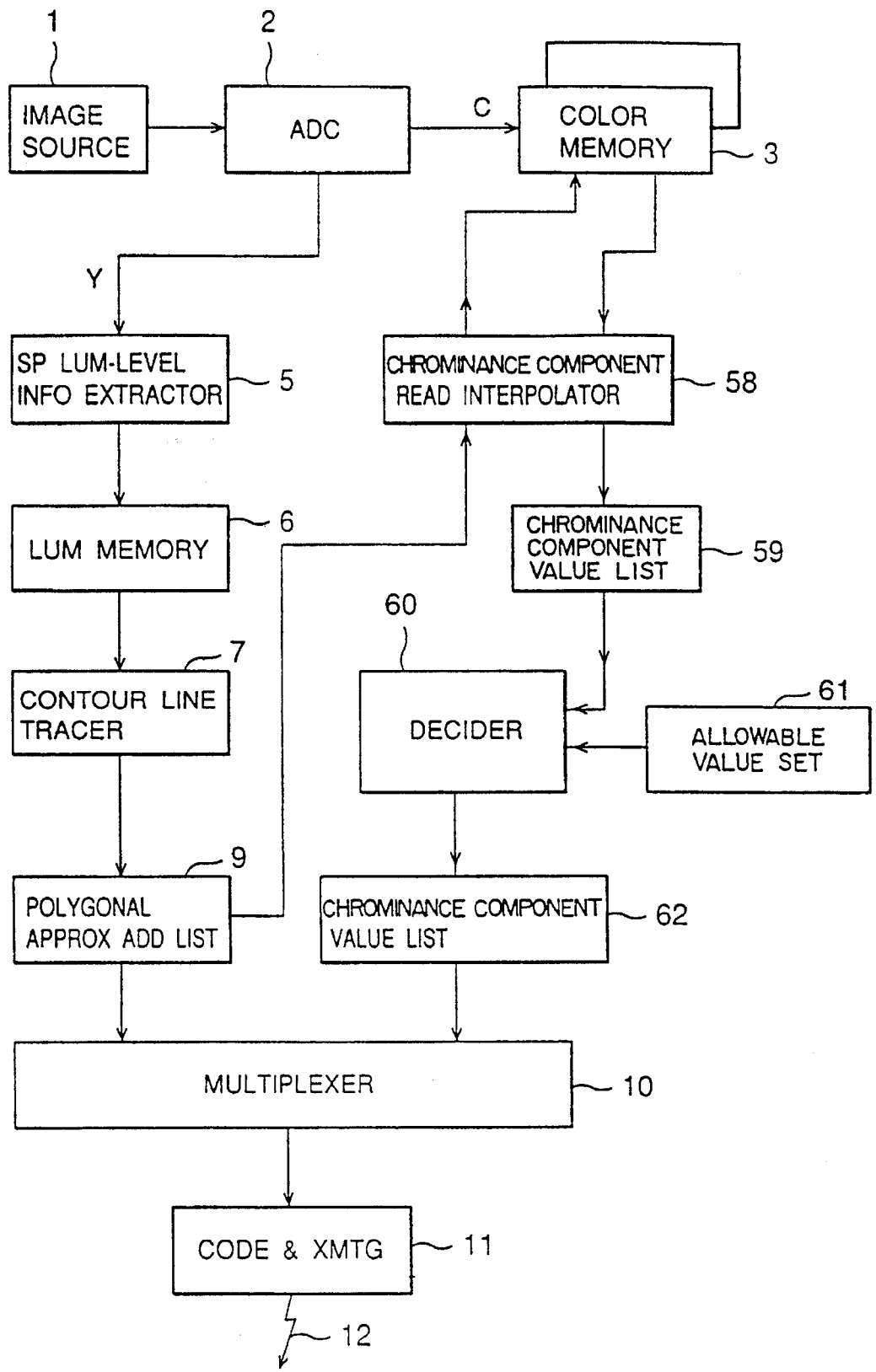
FIG. 27 is a block diagram showing the compression side, for realizing the multidimensional multi-valued color image compression and decompression method according to the present invention.
Figure 28:
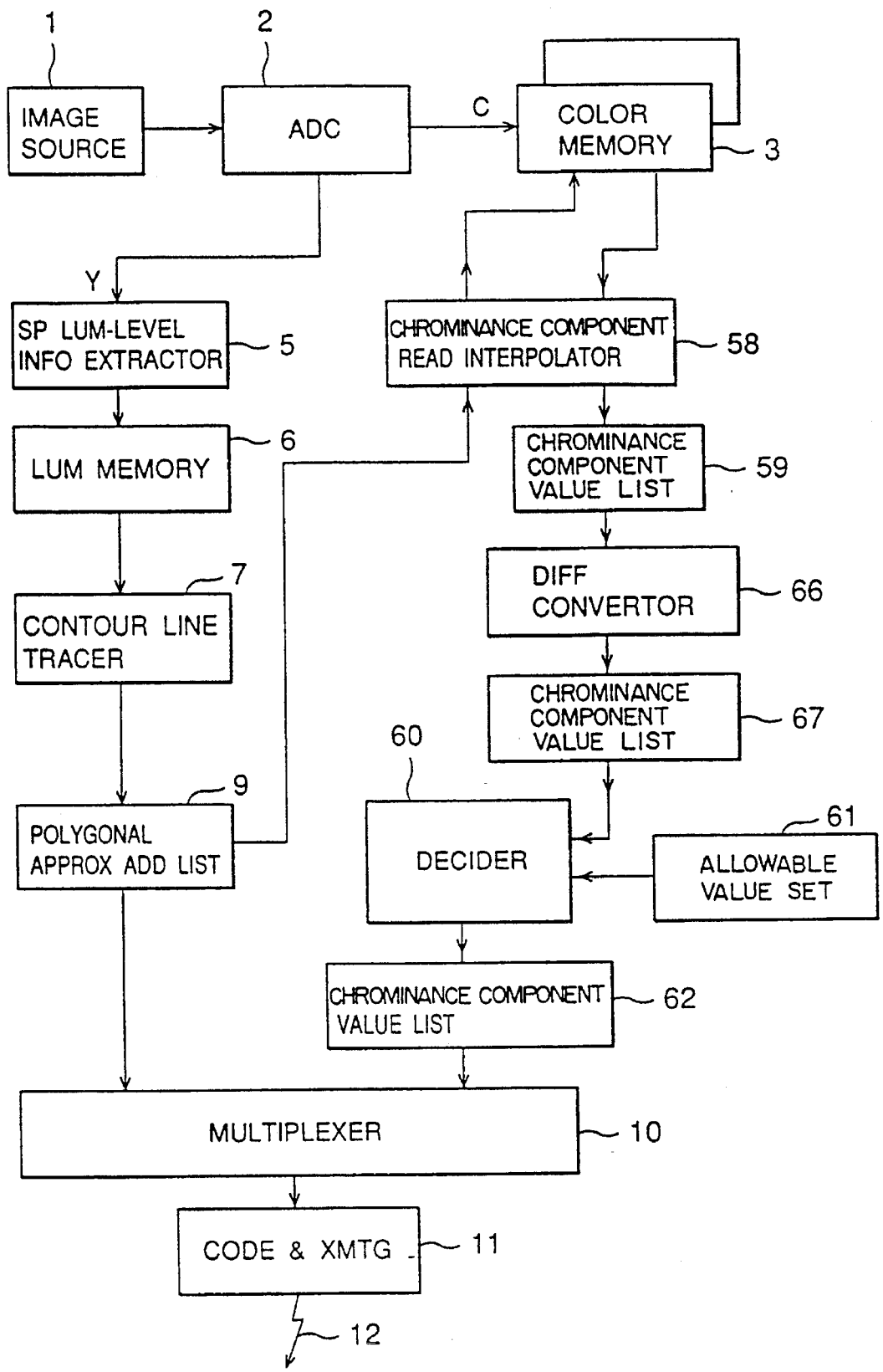
FIG. 28 is another block diagram showing the compression side, for realizing the multidimensional multi-valued color image compression and decompression method according to the present invention.
Figure 29:
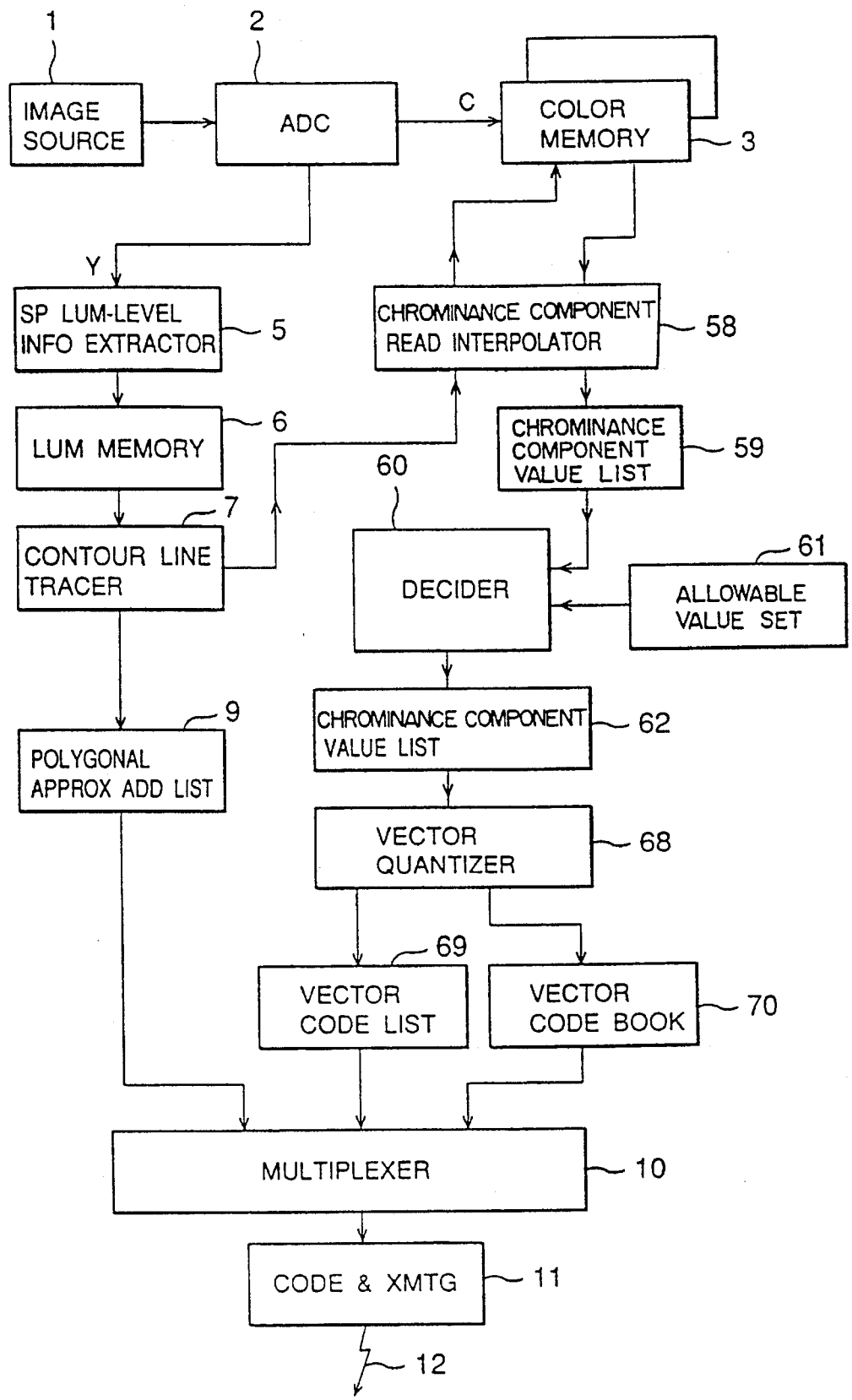
FIG. 29 is the other block diagram showing the compression side, for realizing the multidimensional multi-valued color image compression and decompression method according to the present invention.
Figure 30:
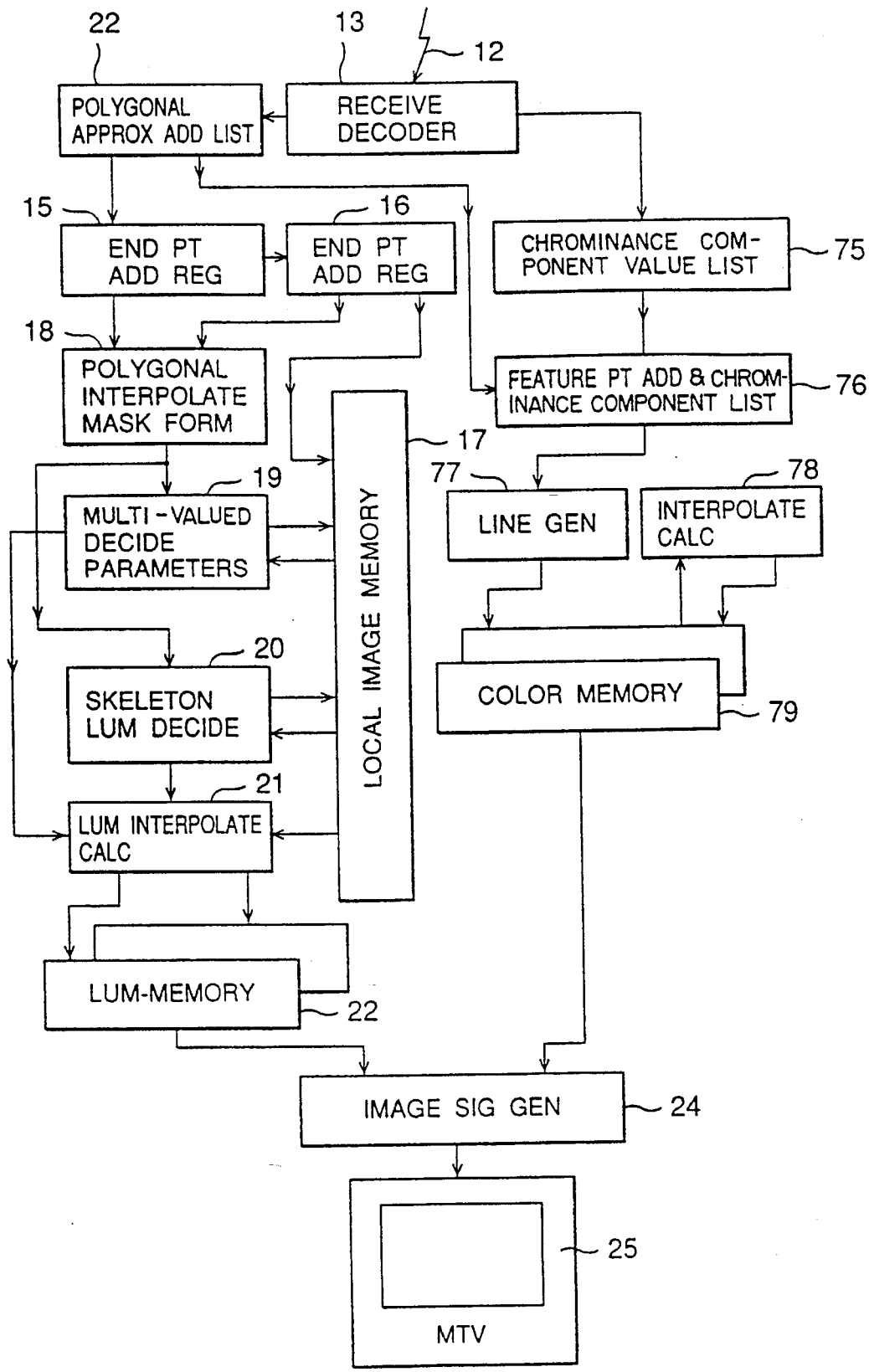
FIG. 30 is a block diagram showing the decompression side, for realizing the multidimensional multi-valued color image compression and decompression method according to the present invention.

FIGS. 27 to 29 are block diagrams showing the compression side, and FIG. 30 is a diagram showing the decompression side. After an image signal inputted by the image source 1 has been A/D converted by the ADO (analog-digital convertor) 2 and further separated into the luminance component Y and the chrominance components C, the chrominance components C are supplied to the color memory 3 and the luminance component Y is supplied to the specific luminance level information extra section 5, respectively. In FIGS. 27 to 29, the luminance component processing system composed of the specific luminance level information extract section 5, the luminance memory 6, the equi-luminance line tracer 7, and the polygonal approximation address list 9 has already been described in detail under <Application to luminance component>, so that the description thereof is omitted herein.

In brief, in the luminance component processing system, the equi-luminance lines can be extracted by the equi-luminance line tracer 7, and the extracted equi-luminance lines are given to the polygonal approximation address list 9.

To retrieve the chrominance components, respective feature point coordinate data are supplied from the polygonal approximation address list 9 to a chrominance component value read interpolator 58. The chrominance component value read interpolator 58 executes the address conversion so as to be accessible to color memory 3 and the interpolation calculations for the chrominance component values read from the color memory 3, whenever the chrominance component values are sampled. The interpolated chrominance component values are stored in a chrominance component value list 59.

In the construction of the image compression side as shown in FIG. 27, 8 difference in chrominance component value between the current point and the preceding point is calculated, and the calculated difference is given to a decided section 60. The decide section 60 compares calculated difference with a decision criterion allowable value) set in an allowable value set section 61, and generates the chrominance component data when the difference between the two exceeds the decision criterion. The generated data is stored in a chrominance component value list 62, as shown in FIGS. 38A and 38B.

The polygonal approximation address list of the luminance component and the chrominance component list obtained as described above are multiplexed by the multiplexer 10, and then transmitted to the coder 11. The transmitted signals are coded in accordance with a known coding method (e.g., Huffman coding), and then transmitted to the decompression side through the transmission line Further, in the structural example of the image compression side shown in FIG. 28, the chrominance component values of the chrominance component value list 59 are supplied to a difference convertor 66. The difference convertor 66 obtains a difference in chrominance component value between the current point and the preceding point on the basis of the correlation between the feature points. The obtained difference value is given to chrominance component value list 67. The obtained chrominance component value is compared with the allowable value by the decide section 60, in the same way as with the case of the system shown in FIG. 27.

Further, in the structural example of the image compression side shown in FIG. 29, in the same way as with the case shown in FIG. 27, a difference in chrominance component value between the current point and the preceding point is calculated, and the calculated difference is given to the decide section 60. The decide section 60 compares the calculated difference with a decision criterion (an allowable value) set in an allowable value set section 61, and generates the chrominance component data when the difference between the two exceeds the decision criterion. The generated data is stored in the chrominance component value list 62, as shown in FIGS. 38A and 38B. Further, the chrominance component values supplied to the chrominance component list 62 are further supplied to a vector quantizer 68. The vector quantizer 68 regards the chrominance component values (u, v) as a vector on the basis of a vector special distribution of the chrominance component values included in the chrominance component value list, selects a representative vector from a vector group, attaches a number to the selected representative vector, and supplies the numbered vector to the multiplexer via a vector code list 69. The correspondence table between the representative vector numbers and the component values is supplied to the multiplexer 10 via a vector code book 70.

An example of the decompression side shown in FIG. 30 will be explained hereinbelow. The decoder 13 can be constructed so as to have a receiver function or else to have a receiver section in the front stage thereof. The coded data given to the transmission line 12 are decoded by the decoder 13. On the other hand, the luminance component thereof are supplied to the polygonal approximation address list 220, and the chrominance components are supplied to the chrominance component value list 75.

The structural portion from the end point address register 15 to the luminance memory 22 processes the compressed and high-efficiency coded signals on the basis of specific luminance thresholds. The feature point addresses are stored in the two end point address registers 15 and 16, and then given to the polygonal interpolation mask forming section 18 as the two end-point addresses. The polygonal interpolation mask forming section 18 calculates the pixel addresses for the linear interpolation between the two end-point pixels. The calculated address values are stored in the local image memory 17 at a designated luminance.

After that, when the new feature point address is supplied from the polygonal approximation address last 220 to the end point address register 15, the end point addresses so far stored in the end point address register 15 are shifted to the end point address register 16. On the other hand, the polygonal interpolation mask forming section 18 calculates the addresses of the pixels at The two end points for linear interpolation. The calculated addresses are stored in the local image memory 17 at a designated luminance. Whenever the new feature point address is supplied from the polygonal approximation address list 220, the polygonal interpolation mask forming section 18 repeats the above-mentioned operation to calculate the new interpolation in sequence. The sequential calculated address values are stored in the local image memory 17 at a designated luminance.

Further, when a closed curve can be formed completely by the above-mentioned interpolation, the polygonal interpolation mask forming section 18 forms a mask of a specific luminance level by marking the inside of the closed curved lane in the local image memory 17 in bright or dark. The above-mentioned process is executed in a plurality of the signal processing sections (not shown), to form a predetermined number of masks as shown in FIG. 13 by way of example.

Upon the completion of the mask formation by the polygonal interpolation mask forming section 18, the multivalued decide operator 19 and the skeleton luminance decade section 20 operate to allow the luminance plane of the local image memory 17 to be multi-valued. In other words, in order to improve the quality of the reproduced image, the luminance values are reproduced finely in accordance with the luminance interpolation on the basis of the relationship between the luminance at the eight adjacent pixels.

With respect to the luminance-undecided region, as shown in FIGS. 19 to 22, the skeleton luminance decide section 20 operates in such a way that the region central lines (skeleton), that is, a point group equidistance away from the region ends are extracted so that the luminance value at the pixel on the region central line is set to an intermediate value between the two luminance thresholds of two adjacent masks. The decided luminance value is stored in the local image memory 17.

Upon the completion of the above-mentioned luminance decision operation by the multi-value decide operator 19 and the skeleton luminance decide section 20, the luminance interpolation plane calculate section 21 decides the luminance values at the: luminance undecided pixels as [intermediate level], [low level], and [high level], as shown in FIG. 12A. Or else, after the luminance value at the pixel on the region central line is set to an intermediate value between the luminance threshold values of both the adjacent masks, the luminance values at the remaining luminance undecided pixels are decided by the linear interpolation method, as shown in FIGS. 25 and 26, as already explained.

The luminance signals decompressed by the above-mentioned signal processing are stored in the luminance memory 22. The luminance memory 22 operates in such a way that the write operation and the read operation are repeated alternately in sequence. The luminance signals read from the luminance memory 22 are supplied to a video signal generator 24.

On the other hand, the signal processing section composed of a chrominance component value list 75, a feature point address and chrominance component list 76, a line generator 77, an interpolation calculation section 78, a color memory 79, etc. executes the following processing: First, the signal processing section draws lines by connecting a series of feature point coordinate points on the equi-luminance line, as shown in FIGS. 35A and 35B. Further, as shown in FIGS. 36A and 36B, the chrominance component values at the end point pixels are determined as the chrominance component values at the respective feature points, and the chrominance component value at an intermediate pixel between the two end points is decided in accordance with the linear interpolation on the basis of both the end points. After all the lines between the equi-luminance lines have been drawn and the chrominance component values have been decided, as shown in FIG. 37, the chrominance component value at the unknown pixel is obtained in accordance with the linear interpolation by retrieving the pixels having the known chrominance components in the horizontal, vertical and oblique directions and by using the obtained values at the adjacent pixels and the distances between the them.

In other words, in the signal processing section from the chrominance component value list 75 to the color memory 79, the feature point addresses and the chrominance component list are combined by the feature point address and chrominance component list 76. The combined addresses are given to the line generator 77. Further, after the chrominance component values on the equi-luminance line have been developed in the color memory 79, the remaining unknown chrominance component values are obtained by the interpolation calculation section 78, to restore the chrominance components in the color memory 79

The above-mentioned operation is executed for both the chrominance components U and V. The decompressed chrominance signals as processed above are stored in the color memory 79. In the color memory 79, two memories are so operated as to repeat the write operation and the read operation alternately in sequence with respect to each other. The luminance signals read from the color memory 79 are supplied to a video signal generator 24.

In the video signal generator 24 generates video signals conforming to a TV system of a specific scanning standard on the basis of the luminance signals supplied from the luminance memory 22 and the chrominance signals supplied from the color memory 79, and supplies the generated video signals to a monitor TV, so that a reproduced image can be displayed on a display picture of the monitor TV 25.

As described above in detail, in a multidimensional multi-valued image compression and decompression method, according to the present invention, of obtaining feature points satisfying a specific condition on an equi-luminance line set for each specific luminance value previously determined for an image luminance function, and transmitting and recording positions and luminance values at the obtained feature points to restore an image, since the method comprises, in compression, the steps of: tracing at least one pixel contour on the equi-luminance line; and shifting specific equi-luminance line passing-point coordinates on the traced pixel contour to a central position of the pixel respectively, it is possible to solve such a problem that when an image is reproduced on the basis of the specific luminance boundaries obtained by tracing the image contours in the conventional way, one black pixel is generated for each pixel arranged on a specific side of the pixel tracing direction.

Further, in a multidimensional multi-valued image compression and decompression method, according to the present invention, of obtaining feature points satisfying a specific condition on an equi-luminance line set for each specific luminance value previously determined for an image luminance function, and transmitting and recording position and luminance values at the obtained feature points to restore an image, since the method comprises, in decompression, the steps of: to obtain at least one equi-luminance line of a specific luminance value, dividing region whose boundary is decided by the equi-luminance line, into a bright region and a dark region according to a luminance threshold on the image; and filling the divided regions with bright and dark symbols, respectively to form a mask representative of the image on the basis of the binary bright and dark symbols, it is possible to prevent the luminance order from being reversed between the two equi-luminance lines (or equi-luminance planes) when the luminance information at the pixels is decided in image decompression, so that an abnormal luminance distribution on the image can be prevented, without deterioration image quality.

Further, in the multidimensional multi-valued image compression and decompression method, according to the present invention, since the method further comprises the steps of: arranging a plurality of masks representative of the image in the order of intensities of the luminance threshold values corresponding to the respective masks; representing the region between two adjacent masks by an intermediate luminance value between the luminance threshold values of the two adjacent mask; when the relationship between a first luminance value of at least one predetermined central pixel in the mask and second luminance values of eight pixels around the predetermined central pixel is that: (1) the second luminance values ere equal to the first luminance value, the first luminance value is determined to be undecided; (2) the second luminance values are not higher than the first luminance value, the first luminance value is determined to be intermediate value −a, where a is a positive value; (3) the second luminance values are not lower than the first luminance value, the first luminance value is determined to be the intermediate value +a; and (4) the relationship between the first and second luminance values are other than the above (1) to (3), the first luminance value is determined to be the intermediate value; extracting a central line from the region including the pixel of the undecided luminance value, to set at least one pixel on central lane of the region to the intermediate luminance value, when the pixel luminance information are decided on the image decompression side on the basis of the image data markedly compressed on the compression side, it is possible to obtain a reproduced image of multi-gradations and of high quality, without reversing the luminance orders between the equi-luminance line or between the equi-luminance plane, that is, without generating an abnormal luminance distribution on the image.

Further, in the multidimensional multi-valued image compression and decompression method, according to the present invention, since the method further comprises step of: deciding a luminance value at a luminance undecided pixel locating away from the central line of the region, in accordance with linear interpolation on the basis of two luminance values at two luminance-decided pixels locating on both ends of at least one lane extending from the luminance-undecided pixel in a predetermined direction and on the basis of distances between the luminance-undecided pixel and the luminance-decided pixels; or since the method further comprises the step of: deciding a luminance value at a luminance-undecided pixel locating away from the central line of the region, by averaging the luminance values obtained in accordance with a plurality of linear interpolations on the basis of respective two luminance values at two respective luminance-decided pixels locating on both ends of each of a plurality of lines extending from the luminance-undecided pixel in a plurality of predetermined directions and on the basis of respective distances between the luminance-undecided pixel and the luminance-decided pixels along each of a plurality of the extension lines; or the method further comprises the step of: deciding a luminance value at a luminance-undecided pixel locating away from the central line of the region on the basis of plane interpolation values obtained by use of three luminance-decided pixels in the vicinity of the luminance-undecided pixel, it is possible to obtain a reproduced image of multi-gradations and of high quality, without reversing the luminance orders between the equi-luminance line or between the equi-luminance plane, that is, without generating an abnormal luminance distribution on the image.

Further, in a color image compression and decompression method according to the present invention, since the method comprises the steps of: obtaining two-dimensional image addresses and luminance values at a plurality of feature points satisfying a specific condition on an equi-luminance lane set for each specific luminance value previously determined for luminance component for constituting a color image together with chrominance components; obtaining the chrominance component values on the basis of the chrominance components on the feature points; adding the obtained chrominance component values to the two-dimensional address of the luminance component at each feature point, as four-dimensional address data; setting feature point positions of the chrominance components to feature point positions of the luminance component; and transmitting and recording the chrominance component values at the positions, to restore an image, it is possible to use the luminance component and the chrominance components in common, so that it is possible to reduce the amount of the information to be transmitted, without deteriorating the image quality such as color shearing. In addition, it is possible to further reduce the amount of color information by replacing the chrominance components with representative values to such an extent as not to exert a harmful influence upon the equality of the reproduced image, so that a further high efficiency color image compression can be realized.

Further, in the color image compression and decompression method according to the present invention, since the method further comprises the steps of: setting an allowable value for the respective chrominance component values at each feature points on the equi-luminance line; when the chrominance component values at each feature point do not exceed the set allowable value, the chrominance component values at the current feature point are determined to between same as the chrominance component values at the preceding feature point, to reduce the occurrence frequency of the chrominance component values, it is possible to use the luminance component and chrominance components in common, so that it is possible to reduce the amount of the information to be transmitted, without deteriorating the image quality such as color shearing. In addition, it is possible to further reduce the amount of color information by replacing the chrominance components with representative values to such an extent as not to exert a harmful influence upon the equality of the reproduced image, so that a further high efficiency color image compression can be realized.

What is claimed is:

1. A multidimensional multi-valued image compression and decompression method of obtaining feature points satisfying a specific condition on an equi-luminance line set for each specific luminance value previously determined for an image luminance function, and transmitting and recording positions and luminance values at the obtained feature points to restore an image, which comprises, in compression, the steps of:

tracing at least one pixel contour on the equi-luminance line; and shifting specific equi-luminance line passing-point coordinates on the traced pixel contour to a central position of the pixel, respectively.

2. The multidimensional multi-valued image compression and decompression method of claim 1, wherein when an initial tracing direction of the pixel contour matches a vertical scanning direction of the image, the specific equi-luminance line passing-point coordinates are shifted to the central position of the pixel locating on the left side of the tracing direction, respectively; and when the initial tracing direction of the pixel contour matches a horizontal scanning direction of the image, the specific equi-luminance line passing-point coordinates are shifted to the central position of the pixel locating on the right side of the tracing direction, respectively.

3. A multidimensional multi-valued image compression and decompression method of obtaining feature points satisfying a specific condition on an equi-luminance line set for each specific luminance value previously determined for an image luminance function, and transmitting and recording positions and luminance values at the obtained feature points to restore an image, which comprises, in decompression, the steps of:

to obtain at least one equi-luminance line of a specific luminance value, dividing a region in which the equi-luminance line on the image is a boundary, into a bright region and dark region according to a luminance threshold;

filling the divided regions with bright and dark symbols, respectively to form a mask representative of the image on the basis of the binary bright and dark symbols;

arranging a plurality of masks representative of the image in the order of intensities of the luminance threshold values corresponding to the respective masks;

representing the region between two adjacent masks by an intermediate luminance value between the luminance threshold values of the two adjacent masks;

when the relationship between a first luminance value of at least one predetermined central pixel in the mask and second luminance values of eight pixels around the predetermined central pixel is that:

(1) the second luminance values are equal to the first luminance value, the first luminance value is determined to be undecided;

(2) the second luminance values are not higher than the first luminance value, the first luminance value is determined to be the intermediate value −a, where a is a positive value;

(3) the second luminance values are not lower than the first luminance value, the first luminance value is determined to be the intermediate value +a; and (4) the relationship between the first and second luminance values are other than the above (1) to (3), the first luminance value is determined to be the intermediate value; and extracting a central line from the region including the pixel of the undecided luminance value, to set at least one pixel on the central line of the region to the intermediate luminance value.

4. The multidimensional multi-valued image compression and decompression method of claim 3, which further comprises the step of:

deciding a luminance value at a luminance-undecided pixel locating away from the central line of the region, in accordance with linear interpolation on the basis of two luminance values at two luminance-decided pixels locating on both ends of at least one line extending from the luminance-undecided pixel in a predetermined direction and on the basis of distances between the luminance-undecided pixel and the luminance-decided pixels.

5. The multidimensional multi-valued image compression and decompression method of claim 3, which further comprises the step of: deciding a luminance value at a luminance-undecided pixel locating away from the central line of the region, by averaging the luminance values obtained in accordance with a plurality of linear interpolations on the basis of respective two luminance values at tow respective luminance-decided pixels locating on both ends of each of a plurality of lines extending from the luminance-undecided pixel in a plurality of predetermined directions and on the basis of respective distances between the luminance-undecided pixel and the luminance-decided pixels along each of the plurality of lines extending from the luminance-undecided pixel.

6. The multidimensional multi-valued image compression and decompression method of claim 3, which further comprises the step of: deciding a luminance value at a luminance-undecided pixel locating away from the central line of the region on the basis of plane interpolation values obtained by use of three luminance-decided pixels in the vicinity of the luminance-undecided pixel.

7. The multidimensional multi-valued image compression and decompression method of claim 3, wherein when a difference in the luminance threshold between the two adjacent masks is determined d, a=d/3.

8. A color image compression and decompression method, which comprises the steps of:

obtaining two-dimensional image addresses and luminance values at a plurality of feature points satisfying a specific condition on an equi-luminance line set for each specific luminance value previously determined for luminance component for constituting a color image together with chrominance components;

obtaining the chrominance component values on the basis of the chrominance components on the feature points;

adding the obtained chrominance component values to the two-dimensional address of the luminance component at each feature point, as four-dimensional address data;

setting feature point positions of the chrominance components to feature point positions of the luminance component; and transmitting and recording the chrominance component values at the positions, to restore an image.

9. The color image compression and decompression method of claim 8, which further comprises the steps of:

setting an allowable value for the respective chrominance component values at each feature points on the equi-luminance line; and when the chrominance component values at each feature point do not exceed the set allowable value, the chrominance component values at a current feature point are determined to be the same as the chrominance component values at a preceding feature point, to reduce the occurrence frequency of the chrominance component values.

10. The color image compression and decompression method of claim 8, wherein the chrominance component values are obtained in accordance with difference calculus.

11. The color image compression and decompression method of claim 8, wherein the chrominance component values are obtained in accordance with logarithmic difference calculus.

12. The color image compression and decompression method of claim 8, wherein the chrominance component values are obtained in accordance with vector quantization method.

* * * * *